United States Patent
Strohkendl et al.

(10) Patent No.: US 11,133,639 B2
(45) Date of Patent: Sep. 28, 2021

(54) FAST AXIS THERMAL LENS COMPENSATION FOR A PLANAR AMPLIFIER STRUCTURE

(71) Applicant: Raytheon Company, Waltham, MA (US)

(72) Inventors: Friedrich Strohkendl, Santa Monica, CA (US); Makan Mohageg, Northridge, CA (US); Michael Ushinsky, Irvine, CA (US)

(73) Assignee: Raytheon Company, Waltham, MA (US)

( * ) Notice: Subject to any disclaimer, the term of this patent is extended or adjusted under 35 U.S.C. 154(b) by 571 days.

(21) Appl. No.: 16/043,429

(22) Filed: Jul. 24, 2018

(65) Prior Publication Data

US 2020/0036153 A1    Jan. 30, 2020

(51) Int. Cl.
*H01S 3/0941*    (2006.01)
*G02B 6/02*    (2006.01)
(Continued)

(52) U.S. Cl.
CPC ...... *H01S 3/09415* (2013.01); *G02B 6/02338* (2013.01); *H01S 3/042* (2013.01); *H01S 3/08072* (2013.01)

(58) Field of Classification Search
None
See application file for complete search history.

(56) References Cited

U.S. PATENT DOCUMENTS 3,856,494 A * 12/1974 Kitano ............... C03C 13/04
                                              65/426
4,406,518 A *  9/1983 Matsumura ......... C03B 37/0253
                                              385/124
(Continued)

FOREIGN PATENT DOCUMENTS

EP    0 981 191 A2    2/2000
EP    1 003 252 A2    5/2000
(Continued)

OTHER PUBLICATIONS

Liu et al., "Continuous-wave Hybrid Index-antiguided and Thermal-guided Planar Waveguide Laser with Large Mode Area;" Proceedings of SPIE vol. 9342, Solid State Lasers XXIV: Technology and Devices; Feb. 20, 2015; 8 Pages.
(Continued)

*Primary Examiner* — Eric L Bolda
(74) *Attorney, Agent, or Firm* — Daly, Crowley, Mofford & Durkee, LLP

(57) ABSTRACT

Systems and methods described herein provide a thermally compensated waveguide structure having a thermal index profile configured to correct thermal aberrations caused by temperature gradients in a fast axis direction and/or correct other forms of distortions in an output beam generated by the waveguide structure. The waveguide structure includes a core region, one or more cladding, and one or more heat sinks. A geometry of these portions with respect to each other can provide a cold refractive index profile such that a cold refractive index value of a portion of the core region is less than a cold refractive index value of at least one of the one or more cladding regions. Responsive to thermal compensation, the cold refractive index profile is modified, through addition of a thermal index profile, to form a hot index profile having attributes including good overlap of the
(Continued)

fundamental mode with the gain profile and mode clean-up through gain discrimination against higher order modes.

19 Claims, 12 Drawing Sheets

(51) Int. Cl.
*H01S 3/042* (2006.01)
*H01S 3/08* (2006.01)

(56) References Cited

U.S. PATENT DOCUMENTS

| | | | |
|---|---|---|---|
| 5,105,430 A | 4/1992 | Mundinger et al. | |
| 5,233,624 A | 8/1993 | LaPlante et al. | |
| 5,327,444 A | 7/1994 | Mooradian | |
| 5,363,391 A | 11/1994 | Matthews et al. | |
| 5,377,212 A | 12/1994 | Tatsuno et al. | |
| 5,398,130 A | 3/1995 | Redman | |
| 5,778,132 A | 7/1998 | Csipkes et al. | |
| 5,852,622 A | 12/1998 | Meissner et al. | |
| 5,863,017 A | 1/1999 | Larson et al. | |
| 6,014,391 A | 1/2000 | Byren | |
| 6,026,109 A | 2/2000 | Micke et al. | |
| 6,039,632 A | 3/2000 | Robertson | |
| 6,072,814 A | 6/2000 | Ryan et al. | |
| 6,115,402 A | 9/2000 | Caprara | |
| 6,160,824 A | 12/2000 | Meissner et al. | |
| 6,289,031 B1 | 9/2001 | Stultz et al. | |
| 6,417,955 B1 | 7/2002 | Kafka et al. | |
| 6,529,318 B1 | 3/2003 | Kaneda et al. | |
| 6,690,696 B2 | 2/2004 | Byren et al. | |
| 6,738,396 B2 | 5/2004 | Filgas et al. | |
| 6,809,307 B2 | 10/2004 | Byren et al. | |
| 6,810,060 B2 | 10/2004 | Vetrovec | |
| 6,859,472 B2 | 2/2005 | Betin et al. | |
| 6,937,629 B2 | 8/2005 | Perry et al. | |
| 7,065,121 B2 | 6/2006 | Filgas et al. | |
| 7,472,741 B2 | 1/2009 | Johnson et al. | |
| 7,822,091 B2 * | 10/2010 | Jackson | H01S 3/0625 372/49.01 |
| 7,983,312 B2 | 7/2011 | Shkunov et al. | |
| 8,488,245 B1 | 7/2013 | Chann et al. | |
| 8,565,272 B2 | 10/2013 | Shkunov et al. | |
| 8,731,013 B2 | 5/2014 | Byren et al. | |
| 8,787,768 B2 | 7/2014 | Klotz et al. | |
| 8,977,097 B2 | 3/2015 | Filgas et al. | |
| 9,014,226 B2 | 4/2015 | Perin | |
| 9,146,357 B2 | 9/2015 | Wada et al. | |
| 9,574,749 B2 | 2/2017 | Trail et al. | |
| 9,762,018 B2 | 9/2017 | Filgas et al. | |
| 9,865,988 B2 | 1/2018 | Filgas et al. | |
| 10,069,270 B2 * | 9/2018 | McGanty | H01S 3/0632 |
| 2002/0085608 A1 | 7/2002 | Kopf et al. | |
| 2002/0110166 A1 | 8/2002 | Filgas | |
| 2002/0118718 A1 | 8/2002 | Honea et al. | |
| 2003/0010823 A1 | 1/2003 | Tsikos et al. | |
| 2003/0138021 A1 | 7/2003 | Hodgson et al. | |
| 2003/0161375 A1 * | 8/2003 | Filgas | B23K 26/0652 372/66 |
| 2003/0231667 A1 | 12/2003 | Byren et al. | |
| 2004/0028094 A1 | 2/2004 | Betin et al. | |
| 2004/0032896 A1 | 2/2004 | Patel et al. | |
| 2004/0052280 A1 | 3/2004 | Rice | |
| 2004/0258123 A1 | 12/2004 | Zamel et al. | |
| 2006/0108098 A1 | 5/2006 | Stevanovic et al. | |
| 2006/0175041 A1 | 8/2006 | Johnson et al. | |
| 2006/0227841 A1 | 10/2006 | Savich | |
| 2006/0263024 A1 | 11/2006 | Dong et al. | |
| 2007/0238219 A1 | 10/2007 | Bennett et al. | |
| 2008/0037601 A1 | 2/2008 | Nielsen | |
| 2008/0069160 A1 | 3/2008 | Stephens, IV | |
| 2008/0095204 A1 | 4/2008 | Miyajima et al. | |
| 2008/0198882 A1 | 8/2008 | Clar et al. | |
| 2008/0239317 A1 | 10/2008 | Schulkin et al. | |
| 2009/0041061 A1 * | 2/2009 | Shkunov | H01S 3/06704 372/6 |
| 2009/0290167 A1 | 11/2009 | Flanders et al. | |
| 2010/0078577 A1 | 4/2010 | Moriya et al. | |
| 2010/0195676 A1 | 8/2010 | Shakir et al. | |
| 2011/0075687 A1 | 3/2011 | Gokay | |
| 2012/0051688 A1 | 3/2012 | Pitwon | |
| 2012/0103569 A1 | 5/2012 | Kim | |
| 2012/0105946 A1 * | 5/2012 | Strohkendl | H01S 3/06708 359/341.3 |
| 2013/0223470 A1 | 8/2013 | Kim et al. | |
| 2013/0294468 A1 | 11/2013 | Sridharan et al. | |
| 2014/0160786 A1 | 6/2014 | Hargis et al. | |
| 2014/0212094 A1 | 7/2014 | Wada et al. | |
| 2014/0268309 A1 | 9/2014 | Strohkendl | |
| 2015/0071321 A1 | 3/2015 | Moshchansky-Livingston et al. | |
| 2015/0110452 A1 * | 4/2015 | Digiovanni | C03B 37/01297 385/124 |
| 2015/0194784 A1 | 7/2015 | Kwon et al. | |
| 2015/0378093 A1 | 12/2015 | Murgai | |
| 2016/0028210 A1 | 1/2016 | O'Shaughnessy et al. | |
| 2016/0047981 A1 | 2/2016 | Filgas et al. | |
| 2016/0047982 A1 | 2/2016 | Filgas | |
| 2016/0218483 A1 | 7/2016 | Tayebati et al. | |
| 2017/0068058 A1 | 3/2017 | Zamudio et al. | |
| 2018/0013256 A1 | 1/2018 | Filgas et al. | |
| 2018/0254609 A1 | 9/2018 | Filgas et al. | |
| 2018/0261967 A1 | 9/2018 | Filgas et al. | |
| 2018/0261972 A1 | 9/2018 | Filgas et al. | |
| 2019/0288474 A1 * | 9/2019 | Marciante | H01S 3/0672 |

FOREIGN PATENT DOCUMENTS

| | | |
|---|---|---|
| EP | 1 357 647 A2 | 10/2003 |
| EP | 1 492 207 A2 | 12/2004 |
| EP | 2 590 276 A1 | 5/2013 |
| WO | WO 00/27000 | 5/2000 |
| WO | WO 01/61799 A2 | 8/2001 |
| WO | WO 2008/133648 A2 | 11/2008 |

OTHER PUBLICATIONS

PCT International Search Report and Written Opinion dated Aug. 27, 2019 for International Application No. PCT/US2019/032137; 18 Pages.

PCT International Preliminary Report dated Feb. 4, 2021 for International Application No. PCT/US2019/032137; 11 Pages.

* cited by examiner

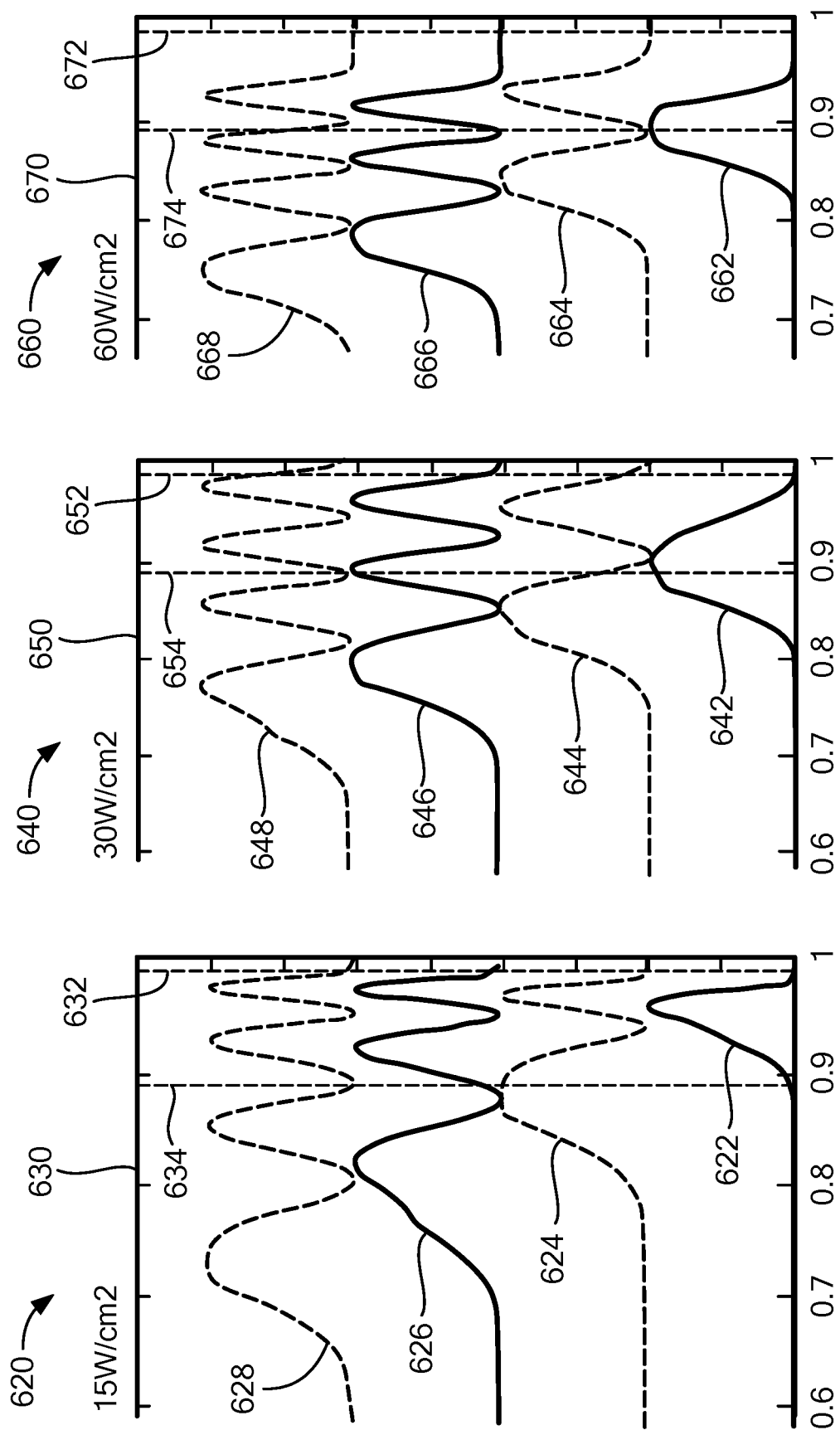

FAST AXIS THERMAL LENS COMPENSATION FOR A PLANAR AMPLIFIER STRUCTURE

BACKGROUND

As is known in the art, an active waveguide, defined by a refractive index profile and a gain profile, can be used to guide and amplify a preferably single mode signal in the optical spectrum. As the signal beam propagates through the waveguide structure, heat is generated as part of the amplification process. This heat can result in a distorted output beam from the active waveguide. For example, the heat generated can cause aberrations and/or otherwise cause distortions in the signal as the signal exits the waveguide in the form of an output beam. Additionally, the aberrations can cause multimode operations, further degrading the quality of the output beam provided from the waveguide. In some applications, such as amplifier applications or high power applications, the heat generated can lead to significant changes in the output beam properties such that a waveguide structure is no longer practical to use.

SUMMARY

In accordance with the concepts, systems, methods and techniques described herein, a thermally compensated single mode waveguide structure can be formed having a thermal index profile that corrects thermal aberrations caused by temperature gradients in a fast axis direction and/or corrects distortions in an output beam generated by the waveguide structure and thus improves overall beam quality and, in particular, fast axis beam quality.

The thermal index profile can modify a refractive index profile of the compensated waveguide structure and modify fast axis properties of the thermal waveguide to correct the aberrations and/or other forms of distortions in the output beam generated by the preferably single mode waveguide structure. For example, the compensated waveguide structure can have a thermal index profile which supports propagation of a single mode signal beam which is well matched to (a) free space beam modes and (b) has good overlap with the gain profile such that energy is efficiently transferred into the single mode signal beam propagating through the thermally compensated waveguide.

The thermally compensated waveguide structure can be formed from a planar waveguide structure having a cold refractive index profile. This cold refractive index profile reflects the refractive index profile for very low or zero power operation. The cold refractive index profile can be formed, responsive to thermal compensation (e.g., heat generated through a pump beam, signal beam, etc.), such that the cold refractive index profile is modified through superposition of a thermal index profile which results in a refractive index profile having preferable waveguide attributes, such as but not limited to, good overlap of the fundamental mode with the gain profile and mode clean-up through gain discrimination against higher order modes at high power. These preferable waveguide attributes can be predicted and configured to target and correct inevitable thermal aberrations caused by temperature gradients in a fast axis direction to improve fast axis beam quality at high power.

The waveguide structures described herein can be referred to as "cold" or in a "cold state" when the respective waveguide structure(s) do not have heat generation occurring within them, such as but not limited to, prior to the application of a pump beam and/or a signal beam. Further, waveguide structures described herein can be referred to as "hot," or being in a "hot state," or "thermally compensated waveguide structures" when heat is generated within the respective waveguide structure(s), such as but not limited to, responsive to a pump beam and/or a signal beam incident on the waveguide structure.

The planar waveguide structure can, in the simplest case, include a core region that is surrounded/sandwiched by one or two cladding regions. Its cold profile, therefore, includes several constant refractive index domains, corresponding to the dimensions of core and claddings. In a more general case, both core, and claddings, can have refractive index profiles, which support the functions of the amplifier. Further, one or more heatsinks can be coupled to the one or more cladding regions through thin layers with defined optical and/or thermal properties. In particular, these properties can be coordinate dependent. In an embodiment, the properties can vary as a function of a fast axis coordinate. The interface between the one or more cladding regions and the one or more heat sinks can be configured to support a waveguide for the pump in the volume comprised by the core region and the one or more cladding regions.

In the most general case, a planar waveguide amplifier has one or two claddings, and a core, and a refractive index profile which depends on the fast axis coordinate, and has one or two heat sinks. In operation, the amplifier guides the pump light and the amplifier has an intensity profile for the pump and a preferred signal intensity profile, both as a function of the fast axis coordinate. The core contains a gain ion profile, and a heat generation profile. These heat and gain profiles are responsive to the pump and signal profiles and their optical powers. Responsive to pump and signal, a temperature profile is created, and such, through the temperature dependence of the refractive index, a thermal refractive index profile is generated.

Under chosen operating conditions, i.e. at a design point, the hot index profile, composed of the sum of the cold index profile and the thermal index profile, supports guided propagation of the preferred signal mode profile, i.e. the preferred mode profile is a mode of the hot waveguide. This design point can be referred to as the thermally fully compensated state of the hot waveguide.

For most practical cases this mode is the fundamental mode. Furthermore, the preferred mode by design (1) fully overlaps with the gain profile for effective energy extraction, and (2) its overlap with the gain profile (as measured by the integral over the product of intensity profile times gain profile) is larger than for any other mode, such that the preferred mode upon propagation, has the highest gain of all modes and such mode clean-up occurs in favor of the preferred mode.

The core region can include gain ions, which can be excited by the pump light, and as such, result in a gain profile. A cold refractive index profile can be formed for the waveguide structure that is defined within the core volume and adjacent sub-regions of the claddings. Within the core region, the cold refractive index profile can have a minimum value with zero derivative and a maximum value, with non-zero derivative, occurring at at-least one interface between the core region and the one or more cladding regions, the non-zero derivative being observed in the limit where the interface is approached from the core side.

Responsive to thermal compensation, a thermal index profile (which creates through its superposition with the cold profile a hot refractive index profile) can be formed for the waveguide structure. In some applications, such as high power applications, the hot index profile can form a flat plateau extending over the width of the gain profile of the waveguide structure, which corresponds to an optimum.

In a cold state, such as prior to thermal compensation, the planar waveguide structure can have refractive index steps at the interfaces between the core region and the one or more cladding regions such that the portion of the core region proximate to the interfaces can have a cold refractive index value that is greater than the cold refractive index values of the one or more cladding regions at their interfaces.

The cold refractive index can be continuous at one or more of the interfaces between the one or more cladding regions and the core region. In such embodiments, the cold refractive index values for the one or more cladding regions can be equal (e.g., constant). The one or more cladding regions can have a cladding refractive index profile (e.g., cold refractive index profile) configured to provide mode filtering such that a fundamental mode of the fast axis coordinate has a greater gain value than higher order modes of the fast axis coordinate.

The cold refractive index profile which supports the preferred behavior is continuous at the core cladding interfaces, i.e. it has no steps. Within the core region, there is an absolute minimum, with respect to the core region, of the cold refractive index with derivative zero with respect to a fast axis coordinate. From the location of that minimum, and within the core volume, the refractive index rises monotonically with a fast axis coordinate towards any of the core-cladding transition regions essentially reflecting the physical nature of the heat transfer process in the lasing device.

In some embodiments, the cold refractive index can be continuous at all of the interfaces between the one or more cladding regions and the core region. In such embodiments, the cold refractive index values for the one or more cladding regions can be equal (e.g., constant) for a symmetric core/cladding/heatsink configuration. In non-symmetric configurations, the claddings at their interfaces with the core will have different refractive index values, to maintain the continuity of the refractive index profiles at the interfaces.

Generalizing further, the location of the minimum of the cold refractive index profile within the core region also depends on the heatsink configuration. In a fully symmetric configuration, the minimum is in the center of the core. Starting with the symmetric configuration, in response to moving the core location closer to one of the heat sinks, said minimum of the cold refractive index moves away from that closer heat sink. In the limiting case, where the core essentially touches the heat sink, said minimum occurs in very close proximity of the core cladding interface distal to the close heat sink. In the case where all heat flows into the close heat sink, location of the minimum is at the distal core cladding interface. This special case is of interest for a profile which has refractive index step at the distal core cladding interface. However, for non-step profiles this case is undesirable as the thermal index profile has no gradient going from the core into the cladding, and such does not provide a gradual decrease in the thermal refractive index when going into the cladding. Such a gradual decrease is preferred for providing mode dependent confinement and such a method for achieving mode clean-up through mode dependent gain.

The waveguide structures can be formed based on a desired operating parameter. For example, the refractive index profile in the cold state can be formed such that its maximum value and/or maximum amplitude occurs away from the center of the heat generating region (e.g., core region, gain ion region) of the waveguide structure, such as but not limited to, at an interface between a core region and one or more cladding regions of the waveguide structure. A sub-class of such cold index profiles occurs when the refractive index profile and the gain profile are formed such that a refractive index value of a portion of the core region is less than a refractive index value of at least one of the one or more cladding regions of the waveguide structure. In some embodiments, a fast axis coordinate of a local maximum of the refractive index profile is spaced a predetermined distance in a fast axis coordinate from a local maximum of the gain profile for operation at the operating parameter.

For a symmetric embodiment, the cold refractive index profile of the waveguide structure (e.g., in a cold state) can have a local minimum or a minimum value in the heat generating region of the waveguide structure. As used herein, a local maximum refers to a largest or a highest value within a given spatial range and the local maximum can correspond to the greatest element or value in the given range. As used herein, a local minimum refers to a lowest or smallest value within a given range and the local minimum can correspond to the least element or value in the given range.

The cold refractive index profile of the waveguide structure can have a local maximum at or within a predetermined distance of an edge, i.e. in a border region of the heat generating region. For example, in one embodiment, a double hump shaped cold refractive index profile, straddling the heat generating region between its maxima, which occur at the humps, may be formed for the waveguide structure, such having local maxima at or within a predetermined distance of one or more different edges of the heat generating region. The edges of the heat generating region may correspond to interfaces between the core region and the one or more cladding regions. Responsive to thermal compensation, a thermal index profile can be formed having a shape such that it fills in a region (e.g., valley) between local maxima of the cold refractive index profile to provide a generally flat plateau at the desired operating parameter, or it has a local maximum in the heat generating region at the desired operating parameter. Thus, responsive to thermal compensation, a refractive index value at or near a center portion of the heat generating region can be equal to or greater than refractive index values at the edges of the heat generating region (e.g., at the interface(s) between the core region and the cladding regions).

For an asymmetric embodiment, the cold refractive index profile of the waveguide structure can have a local minimum or a minimum value in the heat generating region of the waveguide structure. The refractive index profile of the waveguide structure (e.g., in a cold state) can have a local maximum at or within a predetermined distance of at least one heat sink. Responsive to thermal compensation, a thermal index profile can be formed having a shape that includes a generally a flat plateau at the desired operating parameter or has a local maximum in the heat generating region at the desired operating parameter.

Thus, for both symmetric and asymmetric embodiments, the waveguide structure in the cold state can be formed having properties such that at the desired operating parameter, a thermal index profile having a desired shape is formed to provide good overlap of the fundamental mode with the gain profile and mode clean-up through gain discrimination against higher order modes.

The thermally compensated waveguide structure can include a core region, one or more cladding regions, and one or more heat sinks, which together can form a waveguide structure and be configured to guide and/or control optical signals and their modes. An optical pump can be coupled to the waveguide structure to provide a pump beam to thermally compensate the waveguide structure. For example, the pump beam can propagate through a volume defined at least by the core region and the one or more cladding regions to modify refractive index properties of the waveguide structure.

Heat can be generated in the core region responsive to the pump beam and the heat can be dissipated from the core region through the one or more cladding regions and, in some embodiments, into the one or more heat sinks, resulting in a temperature gradient in the material of the waveguide structure. A refractive index of different portions of the waveguide structure can be temperature dependent, thus a change in the local temperature can provide a respective local change in a refractive index (n) in the material of the waveguide structure. It can be characterized by dn/dT, the first derivative of the refractive index with respect to temperature. In an embodiment, the refractive index change induced by the thermal compensation can add linearly to the existing refractive index profile and can alter the overall refractive index profile and its waveguiding properties, forming a thermally compensated index profile. A waveguide structure having the said compensation is also characterized by a modified thermal distortion and residual thermal stresses.

In some embodiments, the waveguide structure in a cold state can have a refractive index profile that is approximately zero in a gain region. In such an embodiment, the thermal index profile can be formed such that it forms a waveguide of its own. However, under such conditions and at desirable high power, the waveguide formed has a fundamental mode profile which is compressed/contracted in the fast axis, such that its overlap with the gain profile is suboptimal.

Therefore, in other embodiments, the waveguide structure in a cold state can have a refractive index profile which has a negative amplitude or negative value in the gain region, but zero amplitude in one or more cladding regions. In such an embodiment, the thermally compensated index profile can be formed such that it has a flat plateau in the gain region. In this case, the mode confinement occurs through the thermal index profiles which are formed in the claddings. The gradual fall-off of the thermal refractive index profile between the edge of the core and the corresponding heat sink leads to mode dependent confinement, with higher order modes being less confined. As a result, the fundamental mode has better, i.e. more, overlap with the gain profile and as such higher gain than higher order modes. Gain filtering in favor of the fundamental mode is achieved. The gradual fall-off of the thermal refractive index profile is illustrated in FIG. 6D. For example, the refractive index profiles 682, 684, and 686 illustrate this fall-off in the thick cladding. FIG. 6B shows mode profiles corresponding to the refractive index profile labeled 684. As can be seen, the fundamental mode has better overlap with the gain region, which extends between the edges of the gain region 654 and 652, than any of the higher order modes.

In the core region, where an amplitude of the refractive index profile in the cold state can be positive, zero, or negative, the thermal index profile can be formed such that it forms the dominant contribution to the waveguide. The thermal index profile can naturally encompass the core region including the gain region, as this is where the heat is generated (e.g., heat generating region). For example, the thermal index profile can be formed such that it is peaked within the core region. However, it should be appreciated that the thermal index profile can extend outside the core region and may extend through the one or more cladding regions to the one or more heat sinks, as is for example illustrated in index profiles of FIGS. 4A and 4B. Therefore, the thermal index profiles described herein can be different from other index profiles which are confined to a narrow core region, such as but not limited to a step index guide.

The thermal index profile can be configured to perform mode filtering to favor the fast axis fundamental mode and filter out the effects of higher order modes that can degrade the quality of an output beam, thus improving the overall beam quality of the waveguide structure. To preserve favorable mode filtering at a desired operating parameter or operating range (e.g., high power operating conditions), the waveguide structure in the cold state can be formed having an amplitude of the refractive index profile that is approximately zero or less than zero (e.g., it, in particular, can be antiguiding, with a negative refractive index profile in the core region).

The pump beam includes photons having a photon energy at a predetermined level and be configured to excite a gain region (or gain medium), here within the core region, such that gain is provided to a signal beam propagating through the core region. In an embodiment, the properties of the pump beam can be selected based at least in part on properties of the gain region and/or a level of energy necessary to excite the gain region for a particular application of the waveguide structure.

In an embodiment, the pump beam can excite the gain region, such that the signal beam propagating through experiences gain and extracts energy. There can be a theoretical minimum amount of heat released which arises from the quantum defect energy between the pump beam and signal beam. Further, there can be an additional amount of heat generated from fluorescence which also involves quantum defect heating. In some embodiments, the wavelength properties of the pump beam can be selected based in part on the rate of pump absorption and/or the quantum defect.

Heat sinks can be coupled to different surfaces of the waveguide structure to provide symmetric or asymmetric cooling to the core region and thus modify a heat transfer rate (e.g., operating parameter) of the waveguide structure. For example, the waveguide structures described herein can be formed having at least two different geometries, fast axis symmetric geometry or a fast axis asymmetric geometry.

Optimally, heatsinks are coupled to the waveguide structure with minimal interfacial thermal resistance between heatsink and waveguide structure. The symmetry of the thermal refractive index profile and the location of its maximum can be affected by the thermal parameters of heat sinks, including their thermal conductivity, thermal diffusivity and thermal mass as well as their interfacial thermal resistance. For example, a geometrically symmetric waveguide configuration can display an asymmetric thermal response.

In a fast axis symmetric geometry, a core region of the waveguide structure can be symmetrically cooled or retain symmetry while lasing. For example, the one or more heat sinks can be disposed such that a maximum temperature within the waveguide structure is within core region or within a middle region of the core region. In an embodiment, the heat sinks can be disposed such that multiple surfaces or edges of the core region have the same or substantially similar heat dissipation properties.

In some fast axis symmetric geometry embodiments, a cold refractive index profile of the core region can be modified such that the particular core region is non-guiding or anti-guiding in the cold state and thus, achieves its refractive waveguiding properties only once the waveguide, through the action of the pump beam and signal beam achieves a hot state. For example, in one embodiment, the gain profile of the core region can be modified such that the amplitude of the refractive index profile is zero or less than zero, i.e. the numerical aperture of the core region is approximately zero (NA=0) or undefined (in the antiguiding state) when in the cold state.

In a fast axis asymmetric geometry, a core region of the waveguide structure can be asymmetrically cooled. For example, the one or more heat sinks can be disposed such that a maximum temperature within the waveguide structure is at an edge (or border) of the core region or located not at a middle region of the core region. The one or more heat sinks can be disposed such that multiple surfaces or edges of the core region have different heat dissipation properties.

In such an embodiment, a biased fast axis cold refractive index profile can be generated for the core region. The biased fast axis refractive index profiles can be formed such that they are peaked on the edge of the core region proximate to the nearest heatsink. The location of the peak of the cold refractive index profile can vary with a particular application of a waveguide structure and/or can be selected to prevent, at high power operations, spatial mode collapse but instead achieve single mode operation with optimum overlap with the gain region occurring for the fast axis fundamental mode.

In an embodiment, the fast axis asymmetric geometry can provide more efficient heat removal and such lower temperature rise in the core than fast axis symmetric geometry and can be used for high power applications (e.g., 10 kW to multi 100 kW applications). In fast axis asymmetric geometries, the core region can be disposed next to or otherwise coupled to one or more heat sinks.

In one aspect, a planar amplifier structure comprises: a core region including a gain region having a gain ion profile; one or more cladding regions disposed adjacent to the core region; and one or more heat sinks coupled to the one or more cladding regions, wherein the planar amplifier structure has a cold refractive index profile that is convex within the core region for reducing mode compression and increasing overlap of a fundamental mode of the structure with the gain region at an operating parameter.

An amplifier structure can further include one or more of the following features: a geometry of the core region, the one or more cladding regions and the one or more heat sinks with respect to each other form the planar amplifier structure having a hot index profile corresponding to a combination of the cold refractive index profile and a thermal index profile, one or more optical pump beams and a signal beam coupled to the planar waveguide structure to provide pump beam and a signal beam to the planar amplifier structure such that, responsive to the optical beams, a thermally compensated waveguide is formed having a thermal index profile, and wherein the core region is configured to guide optical signals incident on the core region through the core region according to properties of the thermal index profile and the operating parameter of the planar waveguide structure, one or more interfaces between the core and the one or more cladding regions, wherein refractive index values of the core at the one or more interfaces are greater than the cold refractive index values of the one or more cladding regions at the core-cladding interfaces, the cold refractive index profiles are continuous for at least one of the one or more core-cladding interfaces, cold refractive index values for the one or more cladding regions at the core-cladding interfaces are substantially equal, the one or more cladding regions have a refractive index profile and the cladding refractive index profile provides mode filtering such that a fundamental mode of the fast axis coordinate has a greater gain value than higher order modes of the fast axis coordinate, the refractive index profile is continuous at each of the one or more interfaces, cold refractive index values for the one or more cladding regions are substantially equal at the core-cladding interfaces, the one or more cladding regions have a cladding refractive index profile that provides mode filtering such that a fundamental mode of the fast axis coordinate has a greater gain value than higher order modes of the fast axis coordinate, a fast axis coordinate of a local maximum of the cold refractive index profile corresponds to a location in the core region proximate an interface of the core region and the one or more cladding regions, a cold refractive index value at a location in the core region is less than a cold refractive index value of at least one of the one or more cladding regions, the one or more heat sinks provide asymmetric cooling, the one or more heat sinks provide symmetric cooling, the core region has a substantially flat refractive index profile at the operating parameter, and/or the hot index profile provides fast axis thermal lensing for the planar amplifier structure.

In another aspect, a method for an amplifier structure comprises: employing a core region including a gain region having a gain ion profile; employing one or more cladding regions disposed adjacent to the core region; and employing one or more heat sinks coupled to the one or more cladding regions, wherein the planar amplifier structure has a cold refractive index profile that is convex within the core region for reducing mode compression and increasing overlap of a fundamental mode of the structure with the gain region at an operating parameter.

A method can further include one or more of the following features: a geometry of the core region, the one or more cladding regions and the one or more heat sinks with respect to each other form the planar amplifier structure having a hot index profile corresponding to a combination of the cold refractive index profile and a thermal index profile, one or more optical pump beams and a signal beam coupled to the planar waveguide structure to provide pump beam and a signal beam to the planar amplifier structure such that, responsive to the optical beams, a thermally compensated waveguide is formed having a thermal index profile, and wherein the core region is configured to guide optical signals incident on the core region through the core region according to properties of the thermal index profile and the operating parameter of the planar waveguide structure, one or more interfaces between the core and the one or more cladding regions, wherein refractive index values of the core at the one or more interfaces are greater than the cold refractive index values of the one or more cladding regions at the core-cladding interfaces, the cold refractive index profiles are continuous for at least one of the one or more core-cladding interfaces, cold refractive index values for the one or more cladding regions at the core-cladding interfaces are substantially equal, the one or more cladding regions have a refractive index profile and the cladding refractive index profile provides mode filtering such that a fundamental mode of the fast axis coordinate has a greater gain value than higher order modes of the fast axis coordinate, the refractive index profile is continuous at each of the one or more interfaces, cold refractive index values for the one or more cladding regions are substantially equal at the core-cladding interfaces, the one or more cladding regions have a cladding refractive index profile that provides mode filtering such that a fundamental mode of the fast axis coordinate has a greater gain value than higher order modes of the fast axis coordinate, a fast axis coordinate of a local maximum of the cold refractive index profile corresponds to a location in the core region proximate an interface of the core region and the one or more cladding regions, a cold refractive index value at a location in the core region is less than a cold refractive index value of at least one of the one or more cladding regions, the one or more heat sinks provide asymmetric cooling, the one or more heat sinks provide symmetric cooling, the core region has a substantially flat refractive index profile at the operating parameter, and/or the hot index profile provides fast axis thermal lensing for the planar amplifier structure.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which like reference numerals indicate like elements:

FIGS. 6A-6C show mode plots of a waveguide structure which has been optimized for operation at 30 W/cm2, when operated below (15 W/cm2, FIG. 6A), at (30 W/cm2, FIG. 6B), and above (60 W/cm2, FIG. C) the optimum compensation point;

DETAILED DESCRIPTION

Figure 1:
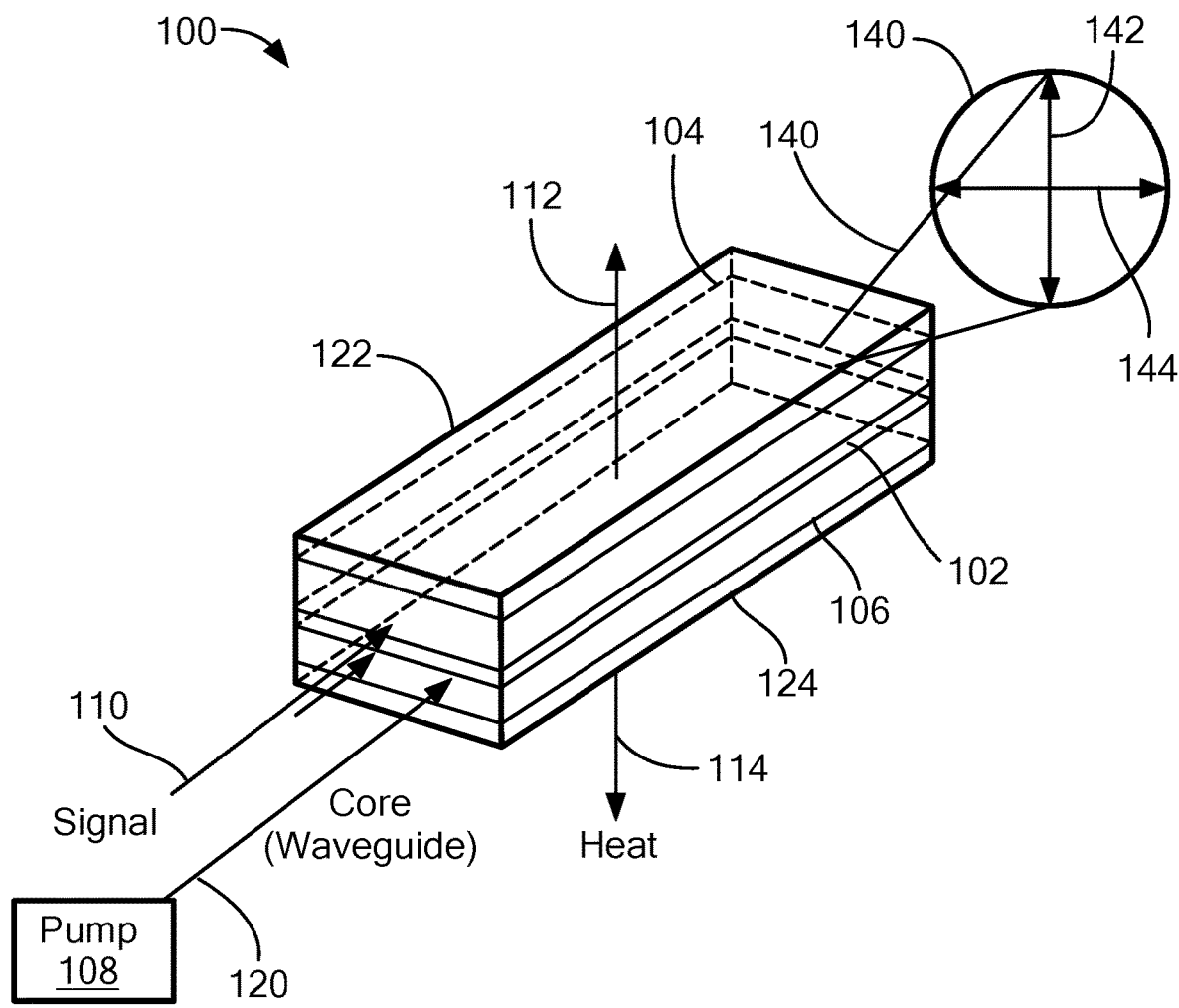
FIG. 1 shows a planar waveguide structure having a core region and two cladding regions, and an optical pump coupled to the volume comprised by the two claddings and the core.

Solid state optical amplifiers considered here have an optical signal beam and one or more optical pump beams. Signal and pump beams propagate through the amplifier such that energy is transferred from the pump to the signal leading to signal amplification. Spatial refractive index structures and profiles are used to control and shape the spatial profiles of the beams to maintain them in preferred states. However, heat is generated in the amplification process which leads to temperature profiles and such through the temperature dependence of the refractive index of the amplifier medium to modification and degradation of the preferred refractive index structures. Here we discuss refractive index structures which are configured to achieve the preferred signal beam properties in a high power state. We refer to these refractive index structures as thermally compensatable, with various degrees of compensation achieved depending on operating conditions (high power, low power, etc.). These structures become optimally compensated near a high power operating point. In particular, these structures are configured to correct thermal aberrations caused by temperature gradients in a fast axis direction and/or correct other forms of distortions in an output beam generated by the waveguide structure and thus improve overall beam quality and, in particular, fast axis beam quality. The thermally compensated waveguide structures can include planar waveguides and optical amplifiers. Since refractive index structures and profiles change as a function of operating parameters, we will refer to (a) low or zero power refractive index profiles as being "cold", or in a "cold state" and to (b) high power refractive index profiles as being "hot" or in a "hot state." In the optical amplifiers discussed here, there is a core region which under operating conditions, confines the signal transversely and as such provides a guide for the propagating signal. An element contained in the core region is the gain region, and in particular the underlying gain ion profile which provides gain when activated by the pump. Conventionally, the extent of the core region is defined by its "cold refractive index profile" which is a waveguide for the signal, in particular, a waveguide which supports a preferred signal spatial mode. Here we will discuss cores which may or may not be waveguides in the cold state. Therefore, a remaining feature of the core is the gain ion profile. The cold refractive index profiles described herein are designed for a high power state, such that the fundamental mode of the hot refractive index profile has optimum overlap with the gain profile.

The heat generated in the gain providing core, in a high power state, is sufficient on its own to create a refractive index profile which guides the signal. However, at high powers of interest, such self-generated guides support fundamental modes of transverse dimensions smaller than the dimensions of the gain profile. We refer to this effect as mode compression. Under such conditions energy extraction by the fundamental mode becomes inefficient, which leads to beam instabilities and operation including unwanted higher order modes. Mode compression occurs in any conventional, cold-state optimized, refractive index structures, when they are operated in a sufficiently hot state. For example, square or step index waveguides experience this effect. However, an advantage of a step index guide is its flat index region which allows for desirable very large modes. One objective of the embodiments of thermally compensated waveguides disclosed herein is to achieve guides which achieve the flat index region, and therefore, very large modes at a high power operating point.

The following example method can be used to construct a cold refractive index profile for a high power optical amplifier structure which has preferable properties at a high power operating point.

(1) Consider a practical planar waveguide configuration which includes heat sinks, a pump waveguide (the volume extended by claddings and core), a gain ion profile and a cold refractive index profile, $n_0(x)$, and a profile for non-laser active absorption. Also choose a power level for the pump.

(2) Choose a desired signal intensity profile and signal power.

(3) Solve the laser equations which includes the pump interacting with the desired signal profile and derive the steady state heat generation profile.

(4) From the heat generation profile, calculate the resulting temperature profile, $\Delta T(x)$, which is the temperature rise relative to the cold state.

(5) Calculate the resulting (refractive) index profile, which is the sum of (a) the cold index profile, and (b) the thermal index profile. The thermal index profile is obtained by multiplication of the temperature profile $\Delta T(x)$ with the temperature coefficient of the refractive index, dn/dT. Call this resulting refractive index profile the non-optimized hot refractive index profile $n_1(x)$, where $n_1(x)=n_0(x)+dn/dT \cdot \Delta T(x)$.

(6) Calculate a refractive index profile, which supports wave-guided propagation of the desired signal intensity profile. Call this the desired profile $n_2(x)$.

(7) Calculate the difference profile between the non-optimized and desired profile and call it $\Delta n(x)$, with $\Delta(x)=n_2(x)-n_1(x)$.

(8) Construct the cold refractive index profile, $n_3(x)$, which supports the desired signal profile at the desired power level, by adding the difference profile to the existing cold profile: $n_3(x)=n_0(x)+\Delta n(x)$. We could call $n_3(x)$ the optimized, thermally compensatable cold refractive index profile.

The waveguide structures described herein can include a core region, one or more cladding regions, and one or more heat sinks that in combination form a waveguide to guide or otherwise control modes propagating in a fast axis direction responsive to a signal incident on the waveguide structure. The waveguide structure can be formed, having a cold refractive index profile corresponding to an operating parameter, such that a refractive index value of a portion of the core region is less than a refractive index value of at least one of the one or more cladding regions.

For example, the waveguide structures described herein can be formed having cold refractive index profiles constructed to counter the undesirable mode compression and achieve, in a hot state, optimal overlap of the fundamental mode with the gain profile. The optimum overlap with the gain profile can be achieved when the cold refractive index profile within the core region is flat or substantially flat (small deviations from the operating point can cause small deviations from flatness). Using the flat refractive index profile at a desired operating level, and a known temperature profile, the cold refractive index profile can be constructed. The desired cold refractive index profiles can have a special property, such that at one operating point, the desired flat refractive index profile within the core region can be achieved.

In a hot state, the maximum of temperature is within the core volume, as heat is generated in the core region and since heat flows away from the temperature maximum to the heatsinks. Therefore, a cold refractive index profile, $\Delta n_{cold}(x)$, can be formed having a minimum value (e.g., local minimum) inside the core region. In one embodiment, such as in the case of asymmetric cooling, where only one heat sink is used, the minimum can be located at an interface between the core region and cladding region that is disposed farthest from the respective heatsink.

Going from the location of the maximum in temperature within the core region, towards any of the one or more interfaces between the core region and the one or more cladding regions, the temperature falls monotonically.

The cold refractive index profile, $\Delta n_{cold}(x)$, can have a minimum value (e.g., local minimum) within the core region and the derivative of that minimum, with respect to fast axis coordinate x, can be zero. From the minimum value going towards the interfaces between the core region and the one or more cladding regions, the cold refractive index values can increase monotonically. For example, this includes a special case, when the maximum value (e.g., local maximum) within the core region can occur at or substantially near at least one of the interfaces between the core region and the one or more cladding regions.

It should be appreciated that changing the waveguide structure from symmetric to non-symmetric can leave the maximum value of the compensated cold refractive index profile at one of the interfaces between the core region and the one or more cladding regions.

In a hot state, such as responsive to thermal compensation from an optical signal (includes pump and signal beams) an index profile can be formed for the waveguide structures described herein. At the compensation point the index profile may correspond approximately to a step index profile, which from the base of the step falls off gradually into the one or more cladding regions. For example, within such a flat step index profile, the lowest order modes can have the same confinement as the fundamental mode and therefore, the same overlap with the core region. Or, in contrast to the step-index configuration just discussed, at the compensation point, the flat index profile can have a step of zero amplitude at the core cladding interfaces. In such a profile, the fundamental mode has the highest confinement and confinement can decrease significantly with increasing mode order. Therefore, mode profiles with zero step at the core cladding interface are preferred. However, even in the non-zero step index case, specially constructed refractive index profiles discussed here have the advantage of counteracting mode compression which disfavors the fundamental.

The cold refractive index profile can have a hot operating point with a flat-index profile. For example, in some embodiments, at a predetermined operating point, a refractive index step occurs between the core region and the one or more cladding regions where refractive index values are larger in the core region. In other embodiments, at a predetermined operating point, no refractive index step may occur between the core region and the one or more cladding regions, thus the refractive index profile ($\Delta n(x)$) is continuous throughout. It should be appreciated that in such an embodiment, mode filtering can be provided which favors the fundamental mode, as will be discussed in greater detail below.

In still other embodiments, at a predetermined operating point, a first interface between the core region and the one or more cladding regions can have a refractive index step and a second interface between the core region and the one or more cladding regions can be continuous (i.e., has no discontinuity). Such an embodiment can be utilized when the core region is disposed proximate to or otherwise directly near the cooler and the interaction of the fundamental optical mode with the cooler is undesirable as it may cause losses.

To thermally compensate the waveguide, an optical pump can be coupled to the waveguide structure to provide a pump beam to the volume of the waveguide structure to thermally compensate the waveguide structure. The pump beam can excite the core region of the waveguide structure such that heat is generated within the waveguide structure that alters the waveguiding properties of the respective waveguide structure. For example, a cold refractive index (n) of different portions of the waveguide structure can change due to changes in the temperature within the waveguide structure from the heat generated and form the thermally compensated waveguide structure. In an embodiment, the heat generated can modify a cold refractive index profile of the waveguide structure through the formation of a thermal index profile.

Thermally compensated waveguides can be configured such that when an optical signal is incident on the waveguide structure and propagates through the core region, any heat generated from the propagating optical signal does not cause distortions in the beam quality of the beam propagating in the respective waveguide structure or the distortions are limited below a predetermined quality threshold. For example, in some embodiments, the heat from the optical signal can cause changes in the waveguiding properties that can result in a spatial contraction of a fast axis fundamental mode such that overlap of the fundamental mode and a gain region of the core of the waveguide structure is reduced. Thus, higher order modes (2nd order, 3rd order, etc.) can be excited resulting in degradation of the fast axis beam quality.

The thermally compensated waveguide can be configured to provide fast axis thermal lensing to correct distortions or otherwise improve fast axis beam quality properties of the waveguide structure. Fast axis thermal lensing as used herein can refer to a lensing effect on fast axis properties of the thermally compensated waveguide structure that can be induced by a thermal index profile formed within the thermally compensated waveguide structure. The thermal index profile can be configured to modify fast axis properties to correct aberrations and/or otherwise correct distortions in an output beam generated by the thermally compensated waveguide structure and thus improve beam quality and, in particular, fast axis beam quality.

Now referring to FIG. 1, a waveguide structure 100 includes a core region 102 and first and second cladding regions 104, 106 disposed adjacent to core region 102. Core region 102 and first and second cladding regions 104, 106 can form a waveguide to guide or otherwise control signals and modes propagating through waveguide structure 100.

In an embodiment, waveguide structure 100 can include and/or be provided as a planar waveguide structure, such as but not limited to an optical amplifier. For example, in some embodiments, waveguide structure 100 can be used as an optical amplifier having a predetermined gain value.

The core region 102 can be disposed between the first and second cladding regions 104, 106. For example, and as illustrated in FIG. 1, first cladding region 104 is disposed adjacent to a first surface 102a of core region 102 and second cladding region 106 is disposed adjacent to a second surface 102b of core region 102.

One or more heat sinks 122, 124 can be coupled to the waveguide structure 100. In an embodiment, heat sinks 122, 124 can be thermally coupled to the waveguide structure 100 to form or generate a one-dimensional thermal gradient across the waveguide structure 100. For example, during operation of waveguide structure 100, heat generated by a pump beam 120 and/or an optical signal 110 (i.e., signal beam) can flow from core region 102, through cladding regions 104, 106 and into heat sinks 122, 124 to generate a one-dimensional spatial temperature variation (e.g., thermal gradient) within waveguide structure 100.

The optical signal beam 110 (referred to herein as "signal") can be incident upon core region 102 and propagate through core region 102 based at least in part on a refractive index profile and/or gain profile of core region 102. As signal 110 propagates through core region 102, heat can be generated within waveguide structure 100. The heat can dissipate (also referred to herein as a heat transfer rate or transverse heat flow rate) from waveguide structure 100 in a first direction 112 from core region 102 and through the first cladding region 104 and into first heat sink 122 and/or in a second direction 114 from core region 102, through second cladding region 106 and into second heat sink 124. In some embodiments, the properties of the core region 102, first and second cladding regions 104, 106, and/or first and second heat sinks 122, 124 may not be adequate for dissipating the heat generated and thus impacting the quality of a beam generated by waveguide structure.

For example, and as illustrated in FIG. 1, waveguide structure 100 can generate a beam 140 having a fast axis (or first beam divergence or radiation angle) 142 and a slow axis (or second radiation angle) 144. In an embodiment, the fast axis can be perpendicular to first and second surfaces 102a, 102b of core region 102 and the slow axis can be parallel to first and second surfaces 102, 102b of core region.

Heat generated within waveguide structure 100 responsive to signal 110 can create aberrations or distortions in the fast axis and/or the slow axis, thereby reducing the quality of beam 140. The waveguide structures described herein can be formed having a cold refractive index profile that has a predetermined response to the thermal compensation such that thermal compensation can be provided to waveguide structure 100 to modify the cold refractive index profile to form a thermal index profile having properties configured to improve the heat dissipation properties of waveguide structure 100 and improve the quality of beam 140, as will be discussed in greater detail below. It should be appreciated that cold refractive index profile as used herein refers to the refractive index profile of a waveguide structure(s) prior to thermal compensation. A thermal index profile (where the hot refractive index profile is the sum of the cold and thermal refractive index profiles) as used herein refers to the thermally activated refractive index profile of a waveguide structure(s) during or after thermal compensation.

An optical pump 108 can be coupled to first and second claddings 104, 106 to provide the pump beam 120. It should be appreciated that optical pump 108 can be coupled to waveguide structure 100 in a variety of different ways. For example, in some embodiments, optical pump 108 can be coupled to waveguide structure 100 such that the pump beam 120 is provided to a composite volume which comprises cladding regions 104, 106 and core region 102. Pump beam 120 can include photons having energy at a predetermined level and be configured to excite a gain medium, here core region 102, such that gain is provided to signal 110 propagating through core region 102. In an embodiment, the properties of the pump beam 120 can be selected based at least in part on properties of core region 102 and/or a level of energy necessary to excite core region 102 for a particular application of waveguide structure 100. In some other embodiments, multiple pump beams might be coupled into the waveguide structure. Going forward it will be implicitly assumed that the pump or pump beam can be multiple pump beams.

Pump beam 120 can be used to thermally compensate waveguide structure 100 and modify cold refractive index properties of waveguide structure 100. For example, pump beam 120 can provide heat to core region 102. The heat provided can form a temperature profile within waveguide structure 100 based in part on the heat sink configuration of heat sinks 122, 124 and/or on the location of core region 102 with respect to cladding regions 104, 106.

In an embodiment, response to pump beam 120, a thermally compensated waveguide can be formed within waveguide structure 100 having a thermal index profile. The geometry of core region 102, cladding regions 104, 106 and heat sinks 122, 124 can be selected based on a desired shape and amplitude of the cold refractive index profile of waveguide structure 100. Thus, in response to pump beam 120, the geometry of core region 102, cladding regions 104, 106 and heat sinks 122, 124 can form a desired thermal index profile configured to minimize and correct aberrations in beam 140 at a particular operating parameter of waveguide structure 100. The thermal index profile can be configured to modify waveguiding properties of waveguide structure 100 based on a predetermined operation parameter. The thermal index profile and operating parameter will be discussed in greater detail below.

Figure 1A:
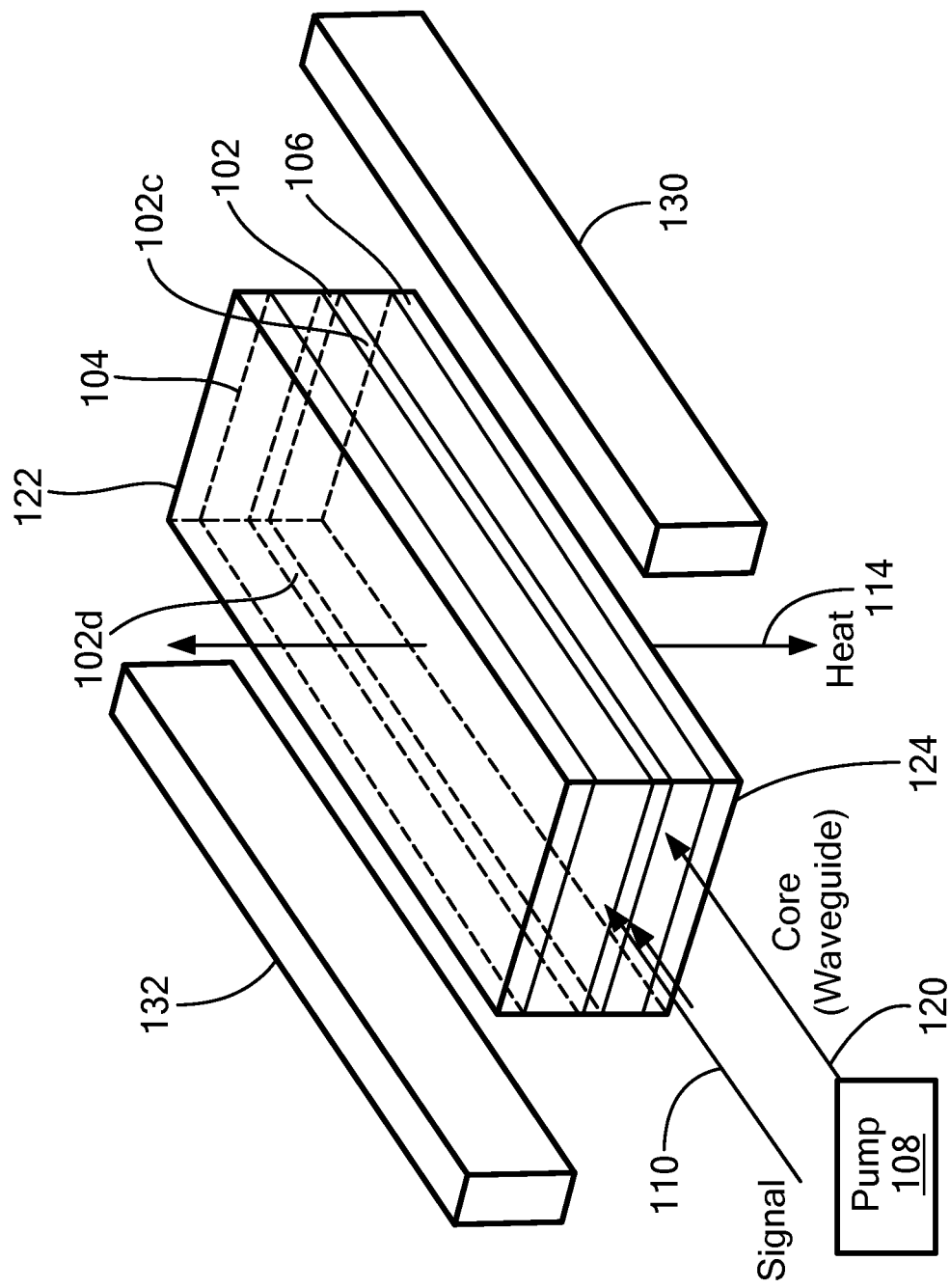
FIG. 1A shows a planar waveguide structure having a core region and four cladding regions, and an optical pump coupled to each of the four cladding regions; an exploded view of the current sensor of FIG. 1.

In some embodiments, more than two cladding regions can be disposed adjacent to core region 102. For example, and now referring to FIG. 1A, waveguide structure 100 includes a third cladding region 130 disposed adjacent to a third edge 102c of core region 102 and a fourth cladding region 132 disposed adjacent to a fourth edge 102d of core region 102. Optical pump 108 can be coupled to one or more of first, second, third and fourth claddings 104, 106, 130, 132 to provide pump beam 120.

It should be appreciated that waveguide structure 100 can include any number of cladding regions (e.g., different than the number of cladding regions described herein) and the cladding regions can be disposed different ways relative to core region 102 based at least in part on a particular application of waveguide structure 100. For example, in some embodiments, waveguide structure 100 can include one cladding region disposed adjacent to core region 102. In other embodiments, waveguide structure 100 can include three cladding regions disposed adjacent to core region 102 or more than four cladding regions disposed adjacent to core region 102. In still other embodiments, the cladding regions can be disposed such that they surround core region 102.

Core region 102 and cladding regions 104, 106, 130, 132 can include silica, fused silica, glass, or silica doped with boron, phosphorus and/or germanium. In some embodiments, core region 102 and cladding regions 104, 106, 130, 132 may include a ferromagnetic material, such as Yttrium iron garnet (YIG). For example, core region 102 and cladding regions 104, 106, 130, 132 may include at least one of a single crystal (SC) YIG, polycrystalline (PC) YIG, hexaferrite YIG, yttrium aluminum garnet (YAG) or a variety of doped YIG and YAG materials. In an embodiment, core region 102 and cladding regions 104, 106, 130, 132 may include any form of gain out of which waveguide structures can be formed, including but not limited to crystalline and/or amorphous oxides.

The dimensions of the core region 102 and cladding regions 104, 106, 130, 132 can be selected to maintain a predetermined core-to-cladding ratio. In some embodiments, the predetermined core-to-cladding ratio can refer to a thickness ratio of each of the core region 102 and cladding regions 104, 106, 130, 132 with respect to each other. The thickness of each of the core region 102 and cladding regions 104, 106, 130, 132 can impact an absorption rate of the pump signal. Different levels of absorption may be required for different applications of waveguide structure 100, such as but not limited to high power applications or low power applications. The predetermined core-to-cladding ratio can be selected based in part on a desired absorption rate of the pump signal. In some embodiments, the predetermined core-to-cladding ratio can be selected based in part on the heating rate (W/cm2, in a direction approximately normal to the signal waveguide) at the desired operating parameter. In some embodiments, a cladding taper may be used to modify or otherwise affect the pump absorption rate and make the heating rate (W/cm2) normal with respect to a waveguide plane and/or normal along a propagation direction. Also, the cladding taper can be designed to minimize the variation in said heating rate vs. longitudinal coordinate in the direction of signal propagation.

In an embodiment, core region 102 may have a different refractive index profile (e.g., higher index of refraction) than cladding regions 104, 106. For example, core region 102 may be formed from similar material as cladding regions 104, 106, however core region 102 may be doped with a different material to increase the index of refraction relative to the index of refraction of cladding regions 104, 106, 130, 132.

Figure 2:
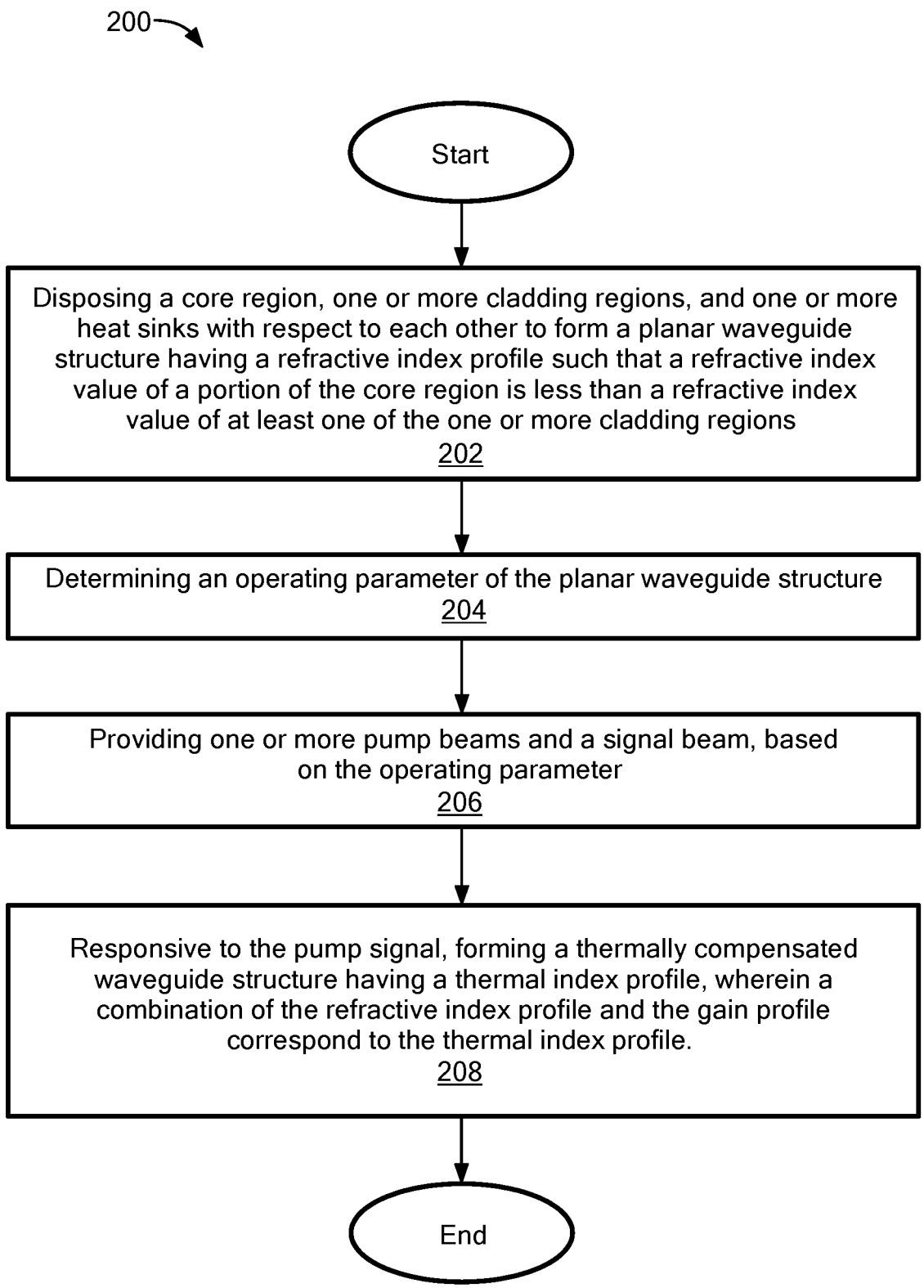
FIG. 2 shows a method for fast axis thermal lensing for a planar waveguide structure.

Now referring to FIG. 2, a method 200 for fast axis thermal lensing for a waveguide structure, such as waveguide structure 100 described above, is provided. In an embodiment, method 200 provides a method for fast axis thermal lensing to correct distortions or otherwise improve fast axis beam quality properties of the waveguide structure 100. A thermal index profile can be formed within the waveguide structure 100 responsive to one or more pump signals 120 provided to the waveguide structure 100. The thermal index profile can be configured to modify fast axis properties of the waveguide to correct aberrations and/or otherwise correct distortions in an output beam 140 generated by the waveguide structure 100 and thus improve beam quality and in particular fast axis beam quality.

Method 200 begins at block 202 by disposing a core region 102, one or more cladding regions 104, 106, and one or more heat sinks 122,124 with respect to each other to form the waveguide structure 100 having a cold refractive index profile ($n_3$ (x)). The core region 102 includes a gain profile (also referred to as a gain ion profile) and the waveguide structure 100 can include a non-laser active absorption profile.

The core region, the one or more cladding regions, and the one or more heat sinks can have a geometry with respect to each other such that a cold refractive index value of a portion of the core region is less than a cold refractive index value of at least one of the one or more cladding regions.

To determine the cold refractive index profile for a particular waveguide structure, such as waveguide structure 100, one or more different profiles and properties of the respective waveguide structure can be used to form an appropriate cold refractive index profile for a particular application of the waveguide structure 100.

For example, the one or more cladding regions 104, 106 can be disposed proximate to the core region 102. The core region 102 and the one or more cladding regions 104, 106 can have heat dissipation properties based at least in part on the type of material they are formed from, their geometry (or symmetry) with respect to each other and/or doping levels within core region 102. For example, using a predetermined signal intensity profile and signal power (e.g., power level of pump signal 120), a heat generation profile for waveguide structure 100 can be determined. The heat generation profile can be based at least in part on the properties of the pump signal 120 interacting with the signal intensity profile.

In embodiments, the waveguide structure 100 has a temperature profile defined by a heat generation rate, heat sink configuration, etc. A location and value of a temperature maximum can be affected by the configuration of the heat sinks 122, 124. For example, the one or more heat sinks 122, 124 can be coupled to the waveguide structure 100, such as but not limited to, coupled to the one or more cladding regions 104, 106. In combination, the core region 102, the one or more cladding regions 104, 106, and the one or more heat sinks 122, 124 can create a heat transfer rate, which corresponds to the temperature profile, for the waveguide structure 100. The heat transfer rate may refer to a rate at which heat is dissipated from the core region 102 through the one or more cladding regions 104, 106 and, in some embodiments, into the one or more heat sinks 122, 124.

A temperature profile ($\Delta T(x)$) can be calculated for the waveguide structure 100 using the heat generation profile. The temperature profile ($\Delta T(x)$) can refer to the temperature rise in response to heat generation (e.g., from a signal 110 and/or pump signal 120) within waveguide structure 100 relative the waveguide structure in a cold state.

The temperature profile and an initial cold refractive index profile $n_0(x)$ can be used to determine an imperfectly/partially compensated refractive index profile ($n_1(x)$), which can be the sum of the initial cold refractive index profile and a thermal index profile of the waveguide structure 100. The thermal index profile can be determined by multiplication of the temperature profile ($\Delta T(x)$) with a temperature coefficient of the refractive index, dn/dT. In an embodiment, the imperfectly compensated refractive index profile ($n_1(x)$) can be determined using the following formula:

$$n_1(x)=n_0(x)+dn/dT*\Delta T(x).$$

A desired, optimal profile ($n_2(x)$) can be determined for the waveguide structure 100. The desired profile ($n_2(x)$) can refer to a refractive index profile which supports wave-guided propagation of the desired signal intensity profile. A difference (or difference profile) between the desired profile ($n_2(x)$) and the uncompensated refractive index profile can be determined using the following formula:

$$\Delta n(x)=n_2(x)-n_1(x).$$

A optimally compensatable cold refractive index profile $n_3(x)$ can be determined based in part on the difference profile. In an embodiment, the optimally compensatable cold refractive index profile $n_3(x)$ can support wave-guided propagation of the desired signal intensity profile at a predetermined operating parameter and/or desired power level by adding the difference profile to an existing cold refractive index profile $n_0(x)$. The compensated cold refractive index profile $n_3(x)$ can be determined using the following formula:

$$n_3(x)=n_0(x)+\Delta n(x).$$

In an embodiment, the optimally compensatable cold refractive index profile may be the same as or substantially equal to the "cold refractive index profile" as recited above with respect to FIG. 1 and below with respect to FIGS. 2-7. For example, the compensated cold refractive index profile can refer to a cold refractive index profile having properties such that a cold refractive index value of a portion of the core region is less than a cold refractive index value of at least one of the one or more cladding regions and responsive to thermal compensation. The cold refractive index profile is modified to form the thermal index profile having attributes including good overlap of the fundamental mode with the gain profile and mode clean-up through gain discrimination against higher order modes, as will be described in greater detail below.

This heat transfer rate can be modified, as will be discussed in greater detail below, and therefore the waveguide structure 100 can be configured to operate at a variety of different selected operating parameters (i.e., heat transfer rates).

The geometry of core region 102, cladding regions 104, 106 and heat sinks 122, 124 can be selected based on a desired shape and amplitude of a cold refractive index profile of waveguide structure 100. For example, the core region, the one or more cladding regions, and the one or more heat sinks can have a geometry with respect to each other such that a cold refractive index value of a portion of the core region is less than a refractive index value of at least one of the one or more cladding regions. In some embodiments, a fast axis coordinate of a local minimum of the cold refractive index profile corresponds to a portion of the core region 102. A fast axis coordinate of a local maximum of the cold refractive index profile can be spaced a predetermined distance from a fast axis coordinate of a local maximum of a gain profile of the core region 102. In some embodiments, the cold refractive index profile can have a minimum with zero derivative and a maximum, with non-zero derivative, occurring at at-least one interface between core region 102 and cladding regions 104, 106.

In some embodiments, cold refractive index values on the cladding side of an interface between the core region 102 and the cladding regions 104, 106 can be greater than the cold refractive index values of the core region 102. In one embodiment, cold refractive index values on the cladding side at each interface between the core region 102 and the cladding regions 104, 106 can be greater than the cold refractive index values of the core region 102.

In an embodiment, in response to thermal compensation, the geometry of core region 102, cladding regions 104, 106 and heat sinks 122, 124 can form a desired thermal index profile configured to correct aberrations in beam 140 at a particular operating parameter of waveguide structure 100.

At block 204, an operating parameter of the waveguide structure 100 can be determined. The operating parameter can be a heat transfer rate (or transverse heat flow rate) of the waveguide structure 100 corresponding to the heat dissipation properties of the respective waveguide structure 100. For example, in some embodiments, the operating parameter can be selected from a range of about 15 W/cm$^2$ to about 70 W/cm$^2$. However, it should be appreciated that the operating parameter can be selected for any heat transfer rate based at least in part on the properties of the respective waveguide structure and/or a particular application of the waveguide structure. The operating parameters are described in greater detail below with respect to FIGS. 6-6D.

At block 206, a pump beam 120 can be provided by a pump 108 to the waveguide structure 100 based in part on the selected operating parameter. In an embodiment, the pump beam 120 can be used to thermally compensate the waveguide structure 100 to meet the selected operating parameter.

The pump beam 120 can be generated based on a thermal compensation factor. In an embodiment, the thermal compensation factor can be determined for the waveguide structure 100 based on the selected operating parameter and can include an energy level to excite the core region 102 (e.g., gain medium) of the waveguide structure 100 such that gain is provided to a signal propagating through the core region 102.

The pump beam 120 can thermally compensate the waveguide structure 100 to modify the cold refractive index profile of waveguide structure 100 and/or heat dissipation properties of the core region 102, cladding regions 104, 106, and/or heat sinks 122, 124 such that the heat transfer rate of the waveguide structure 100 is modified or otherwise altered to the selected operating parameter. For example, the pump beam 120 can be absorbed by the core region 102 and the thermal compensation factor can include a predetermined energy amount or level of photons provided in the pump beam 120. The pump beam 120 can excite the core region 102 such that the waveguide structure 100 is configured to dissipate heat at the selected operating parameter. The compensation factor and the properties of the pump beam 120 can be determined based at least in part on the material forming the core region 102, the cladding regions 104, 106, and/or the heat sinks 122, 124.

At block 208, responsive to the pump beam 120, a thermal index profile can be formed within the waveguide structure 100 such that the core region 102 is configured to propagate or otherwise guide optical signals based in part on the properties of the thermal index profile and the operating parameter. Pump beam 120 can be used to thermally compensate waveguide structure 100 and modify the cold refractive index properties of waveguide structure 100 and form the thermal index profile for waveguide structure 100. For example, the pump beam 120 can excite the core region 102, thereby producing heat 112, 114 and/or an increase in temperature within the core region 102. The heat provided and/or generated within the waveguide structure 100 can form the thermal index profile based in part on the heat sink configuration of heat sinks 122, 124 and/or on the location of core region 102 with respect to cladding regions 104, 106. Responsive to the pump beam 120, the refractive index values in a portion of the core region 102 (e.g., center portion) can be greater than the refractive index values of the cladding regions 104, 106 and/or the refractive index values at an interface between the core region 102 and the cladding regions 104, 106.

The heat 112, 114 can be dissipated from the core region 102 through the one or more cladding regions 104, 106 and into the one or more heat sinks 122, 124. The amount of heat 112, 114 generated within the core region 102 can be based in part on a geometry of the one or more heat sinks 122, 124 with respect to the cladding regions 104, 106 and to the core region 102. The transfer of heat 112, 114 from the core region 102 to the heat sinks 122, 124 can form the thermal index profile within the waveguide structure 100 and therefore, the location and properties of the heat sinks 122, 124 can impact the formation of the thermal index profile.

In some embodiments, the thermal index profile represents a temperature gradient in the waveguide structure 100. For example, the refractive index of the core region 102 and the cladding regions 104, 106 can be temperature dependent and the generation and then transfer of the heat can change the refractive index (n) in the core region 102 and/or cladding regions 104, 106 as the temperature (T) changes. This may be referred to as a temperature dependent refractive index (it is characterized, to lowest order, by the linear temperature coefficient of the refractive index, dn/dT) Thus, the pump beam 120 can be used to thermally compensate and modify properties such as the cold refractive index profile of the waveguide structure 100 to support a variety of different operating parameters and waveguide applications. It should be appreciated that the properties of the core region 102, the one or more cladding regions 104, 106, and/or the one or more heat sinks 122, 124 and/or the geometry of the core region 102, one or more cladding regions 104, 106, and/or the one or more heat sinks 122, 124 can impact the temperature profile and thus the thermal index profile.

It is understood that the cold refractive index is given for a uniform temperature distribution, essentially at the temperature of the environment before application of power. The generated heat causes dn/dT spatial distortions of the refractive index. Embodiments of the invention use a cold refractive index profiles which anticipates the temperature-induced distortion with corrections to the distortions caused by dn/dT. It is understood that heat dissipation/temperature profiles and the cold refractive index profiles are complementary.

In some embodiments, a temperature profile can be generated for the waveguide structure 100 representing the thermal index profile, with each point in the temperature profile representing a temperature value within the waveguide structure 100 at a particular location within the waveguide structure 100. For example, a maximum value of the temperature profile can be located at a point corresponding to a location within the core region 102. In some embodiments, the location of a maximum value of the temperature profile can be based in part on a configuration of the one or more cladding regions 104, 106 and the one or more heat sinks 122, 124.

In some embodiments, the waveguide structure 100 can be formed or modified such that it has a substantially flat cold refractive index profile or no cold refractive index profile. In such an embodiment, the thermal index profile can be formed to influence the propagation of signals (e.g., optical signals) through the core region 102. In some embodiments, when the waveguiding properties of the waveguide structure 100 are modified by the thermal index profile, the waveguide structure 100 may be referred to as a thermal waveguide.

The thermal index profile on its own can induce a lensing effect (also referred to herein as fast axis thermal lensing) on the fast axis properties of the waveguide structure 100 and can, within some power range, provide mode filtering in favor of a fast axis fundamental mode relative to fast axis higher order modes (e.g., $2^{nd}$ order, $3^{rd}$ order, $4^{th}$ order, etc.) such that the fast axis fundamental mode has a greater overlap with a gain region of the core region 102 as compared with the higher order modes. Thus, the thermal index profile can be configured to perform mode filtering to favor the fast axis fundamental mode and filter out the effects of higher order modes that can degrade the quality of an output beam, thus improving the overall beam quality of the waveguide structure 100.

The thermal index profile and the fast axis thermal lens can be formed responsive to the absorption of the pump beam 120 into the core region 102. In some embodiments, the thermal index profile can create a symmetric index profile through a linear temperature dependent refractive index (e.g., dn/dT), which provides a waveguide structure 100 having properties configured to support several modes. In particular, the fundamental mode can have a greater (e.g., optimized) level of confinement within a gain region of a respective core region and thus have greater overlap with the gain region, as compared with higher order modes. Therefore, the waveguide structure 100 can achieve mode discrimination in favor of the fundamental mode. We should however point out here, that the purely thermal waveguides discussed in this paragraph will at sufficiently high powers confine the fundamental mode so strongly that it has incomplete overlap with the gain region. We refer to this effect as "mode compression." Under such circumstances, some of the higher order modes have better overlap and therefore higher gain than the fundamental mode. This is undesirable. For this reason, specific cold refractive index profiles are introduced, which correct for this effect.

In some embodiments, a gain profile of the core region 102 can be modified based at least in part on the thermal index profile and the cold refractive index profile of the core region 102. The gain profile can be modified to correct for deformations in refractive index profile of the core region 102 caused by the thermal index profile and/or to modify waveguiding properties of the core region 102. In some embodiments, the cold refractive index profile of the core region 102 can be tailored or modified based in part on the thermal index profile to modify the waveguiding properties of the core region 102.

The thermal index profile can result in a change of the refractive index profile of the core region 102. For example, in one embodiment, the thermal response, as occurs when the system is operated, can modify a square cold refractive index profile of the core region 102 to form a curved thermal index profile. The thermal compensation can change the refractive index profile such that the thermal index profile has a desired shape and uses the changes caused by the heat generation within the waveguide structure 100 to achieve a desired refractive index profile. It is understood, however, that when there is a cold refractive index profile which is equal to a square index profile, thermal distortions may not work in favor of the fundamental mode, as undesirable mode compression of the fundamental mode may occur.

One or more heat sinks 122, 124 can be coupled to different surfaces of the waveguide structure 100 to provide symmetric or asymmetric cooling to the core region 102 and thus modify a heat transfer rate (e.g., operating parameter) of the waveguide structure 100. For example, the waveguide structures described herein can be formed having at least two different geometries, fast axis symmetric geometry or a fast axis asymmetric geometry.

In a fast axis symmetric geometry, a core region 102 of the waveguide structure 100 can be symmetrically cooled. For example, the one or more heat sinks 122, 124 can be disposed such that a maximum temperature within the waveguide structure 100 is within the core region 102 or within a middle region of the core region 102. In an embodiment, the heat sinks 122, 124 can be disposed such that multiple surfaces or edges 102a-d of the core region 102 have the same or substantially similar heat dissipation properties. The core region 102 can have a step index profile and a gain can be uniformly distributed in the core region 102. Thus, a temperature profile of the core region 102 can be symmetric with respect to the gain region of the core region 102 in a fast axis symmetric geometry.

In some fast axis symmetric geometry embodiments, a cold refractive index profile of the core region 102 can be modified such that the particular core region 102 is non-guiding or anti-guiding and thus, maintains just its respective gain properties. For example, in one embodiment, the cold refractive index profile of the core region 102 can be modified such that a numerical aperture of the core region 102 is approximately zero (NA=0) or the waveguide becomes anti-guiding. In such embodiments, the waveguiding properties of the waveguide structure 100 can be achieved through the induced fast axis thermal lens (e.g., thermal index profile) during operation of the particular waveguide, such as but not limited to, during amplifier operations. The fast axis thermal lens can provide beam cleanup favoring energy extraction by the fast axis fundamental mode. The degree and/or amount of modification to a cold refractive index profile of a particular core region 102 can be selected based at least in part to improve thermal mode distortion and/or reduce the excitation of a higher order modes through gain saturation.

In a fast axis asymmetric geometry, a core region 102 of the waveguide structure 100 can be asymmetrically cooled. For example, the one or more heat sinks 122, 124 can be disposed such that a maximum temperature within the waveguide structure 100 is at an edge (or border) 102a-d of the core region 102 or located not at a middle region of the core region 102. The one or more heat sinks 122, 124 can be disposed such that multiple surfaces or edges 102a-d of the core region 102 have different heat dissipation properties. In one embodiment, one or more heat sinks 122, 124 can be disposed proximate to one edge of the core region 102 and distal from a second different edge of the core region 102. The asymmetric cooling can provide fast axis thermal lensing which pulls a fundamental mode away from a given heat sink 122, 124 and compresses the fundamental mode towards the edge of the core region 102 that is distal from the heat sink 122, 124.

Figure 7:
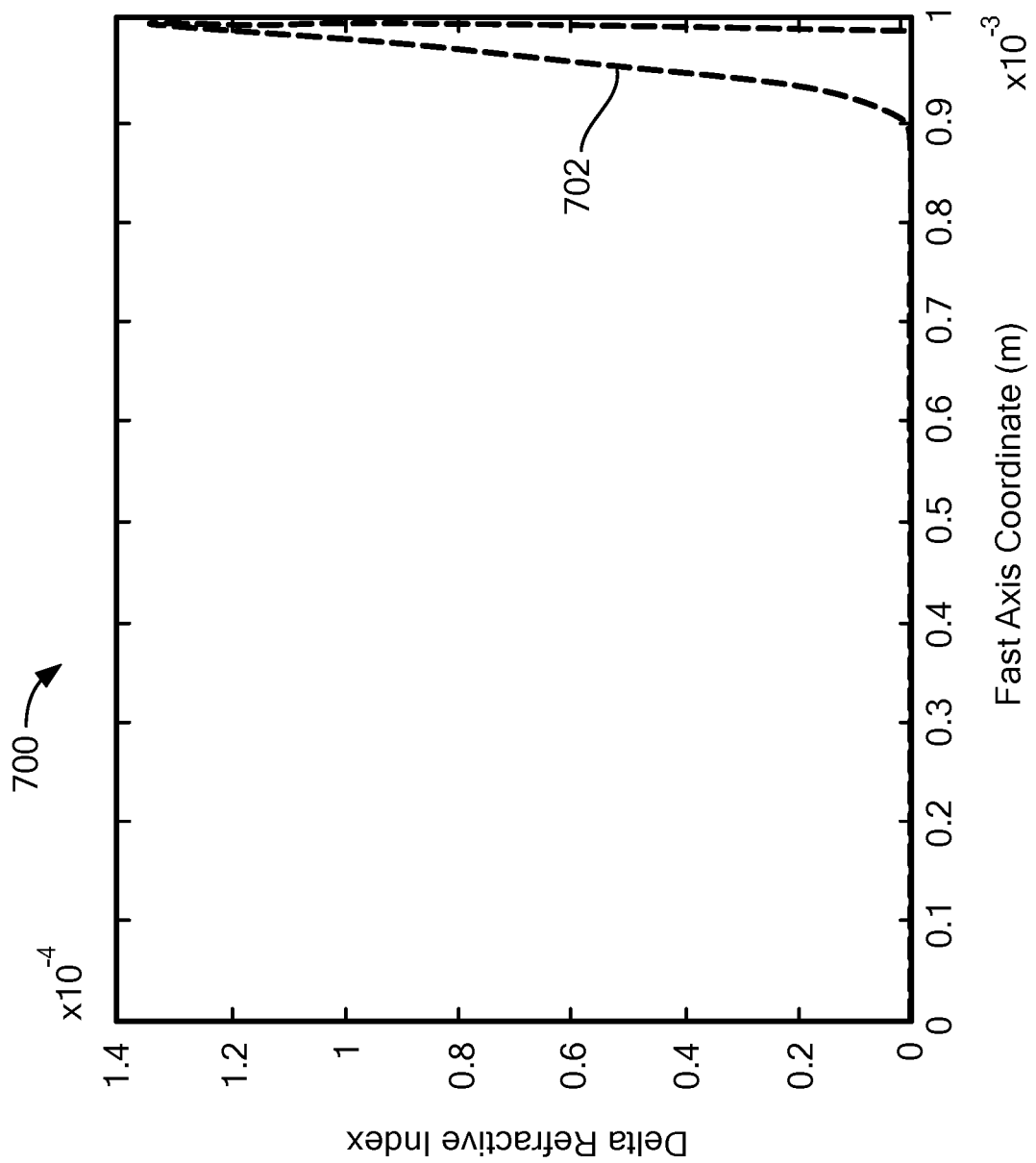
FIG. 7 shows a plot of the cold refractive index profile of the 30 W/cm2 compensated waveguide. Behavior of this waveguide at, and below and above the optimum compensation point is shown in FIGS. 6A thru 6D.

In such an embodiment, a biased fast axis cold refractive index profile can be generated for the core region 102. The biased fast axis refractive index profiles can be formed such that they are peaked on the edge of the core region 102 proximate to the heatsink 122, 124. An example of such a cold refractive index profile is shown in FIG. 7. The location of the peak (e.g., maximum value, local maximum) of the cold refractive index profile can vary with a particular application of a waveguide structure 100 and/or can be selected to prevent mode collapse and/or achieve single mode operation with optimum overlap with the gain region occurring for fast axis fundamental modes at high power operations.

In an embodiment, the fast axis asymmetric geometry can provide a greater cooling factor than fast axis symmetric geometry and can be used for high power applications (e.g., about 20 kw to about 100 kW applications). In fast axis asymmetric geometries, the core region 102 can be disposed next to or otherwise coupled to one or more heat sinks 122, 124.

For high power applications, the thermal index profile generated in the waveguide structure 100 can work together with a statically doped cold refractive index profile of the core region 102 to provide a fundamental mode that is optimally matched within a predetermined threshold value of the gain profile.

In both the fast axis symmetric geometry and the fast axis asymmetric geometry, the thermal index profile and the thermal lens formed can be used to maintain the fast axis mode quality at or above a predetermined value and thus enabling beam correction through one-dimensional methods.

In some embodiments, the thermal index profile can be configured to modify signals in the fast axis direction such that a fundamental mode of the fast axis has a greater gain than higher order modes of the fast axis.

Figure 3:
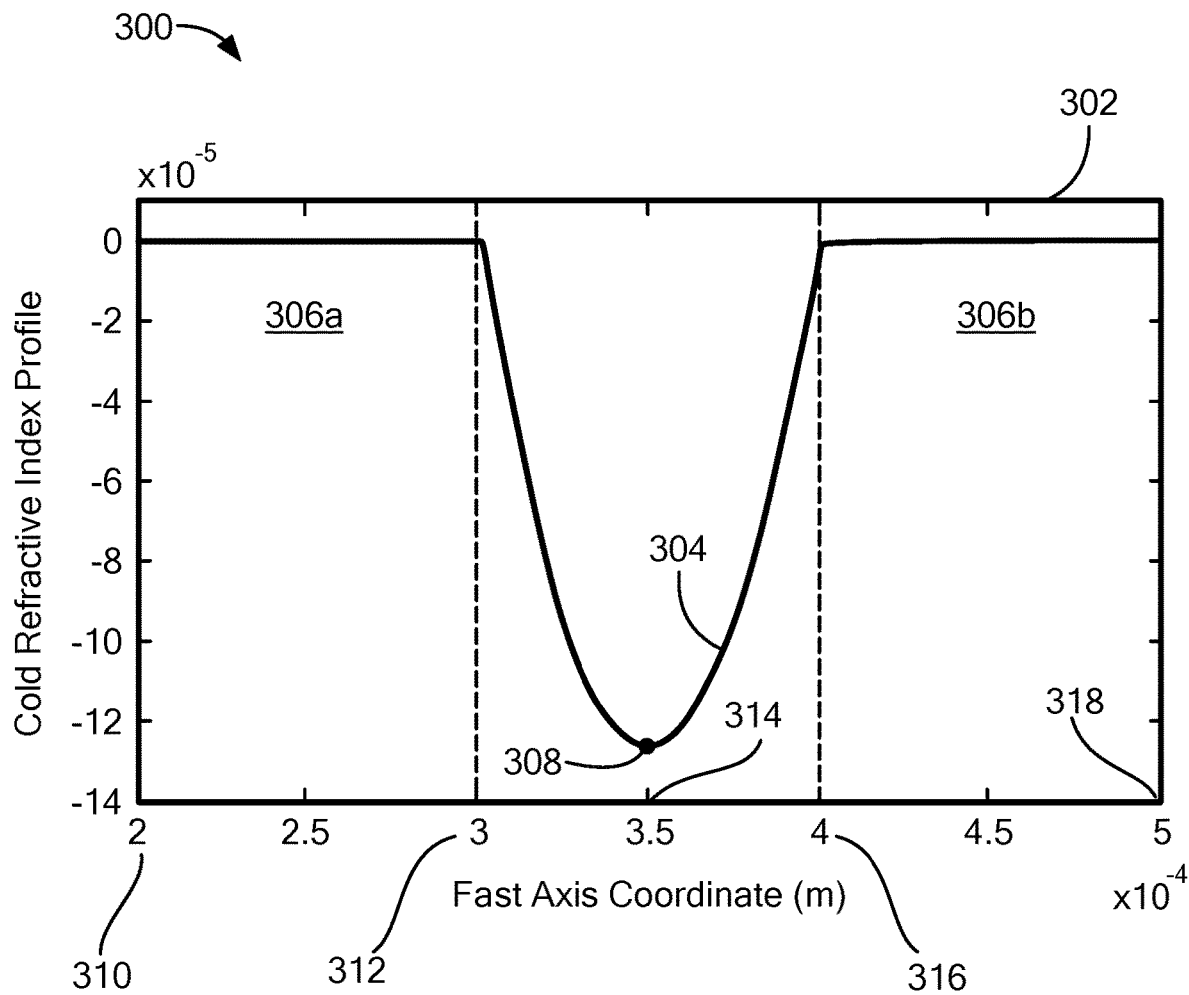
FIG. 3 shows a plot of a cold refractive index profile of a fast-axis symmetric planar waveguide structure which is optimized for high power operation and which is constructed to achieve mode filtering in favor of the fundamental mode at a high power operating point.

Now referring to FIG. 3, a plot 300 illustrates a cold refractive index profile 302 of a waveguide structure (e.g., waveguide structure 100 of FIG. 1), with the vertical axis (e.g., y-axis) corresponding to the cold refractive index values of the cold refractive index profile 302 and the horizontal axis (e.g., x-axis) corresponding to fast axis coordinates of the waveguide structure.

The fast coordinates may correspond to different regions of a waveguide structure. Thus, the cold refractive index profile 302 corresponds to cold refractive index values of the different regions (e.g., cladding regions, core region) of the waveguide structure. For example, a first region 306a from a first fast axis coordinate 310 to a second fast axis coordinate 312 may correspond to a cladding region (e.g., cladding regions 104, 106 of FIG. 1). A second region 304 from the second fast axis coordinate to a fourth fast axis coordinate 316 may correspond to a core region (e.g., core region 102 of FIG. 1). A third region 306b from the fourth fast axis coordinate 316 to a fifth fast axis coordinate 318 may correspond to a cladding region (e.g., cladding regions 104, 106 of FIG. 1).

As illustrated in FIG. 3, the cold refractive index profile 302 for the first region 306a (or cladding region) has a value of approximately zero from the first fast axis coordinate 310 and maintains the approximately zero value until the second fast axis coordinate 312.

For the second region 304 (or core region), from the second fast axis coordinate 312 to a third fast axis coordinate 314, the refractive index profile 302 decreases and has a negative value until reaching a local minimum value 308 at the third fast axis coordinate 314. From the third fast axis coordinate 314 to the fourth fast axis coordinate 316, the cold refractive index profile 302 maintains a negative value but increases from the local minimum 308 until reaching a value of approximately zero at the fourth fast axis coordinate 316. The core region may have a negative value and include the local minimum 308 of the cold refractive index profile 302.

For the third region 306b (or cladding region), from the fourth fast axis coordinate 316 to the fifth fast axis coordinate 318, the cold refractive index profile 302 maintains a value of approximately zero.

For cold refractive index profile 302, the cold refractive index values for the second region 304 are less than the cold refractive index values for the first region 306a and/or the third region 306b. Thus, the cold refractive index value of one or more portions of the core region, here second region 304, is less than a cold refractive index value of at least one of the one or more cladding regions, here first and third regions 306a, 306b. In an embodiment, the core region, the one or more cladding regions and the one or more heat sinks can be coupled together with respect to each other and have a geometry with respect to each other to generate the cold refractive index profile 302. The cold refractive index profile 302 can have a predetermined response to thermal compensation such that in response to the thermal compensation, a thermal index profile is formed that is configured to correct aberrations in a beam guided by the waveguide structure.

One aspect of the cold index profile 300 is that within the core region 304, the functional form is convex. Here, per common mathematical convention, a function is called convex, if the line segment between any two points on the graph of the convex function lies above or on the graph. The convex character is directly related to the underlying physics of heat generation and heat transport (which gives rise to concave temperature profiles). Embodiments of cold profiles disclosed herein, which exhibit preferred behaviors at higher power operating points, may be convex in nature.

In some embodiments, cold refractive index profile 302 can be formed by up-doping portions around and/or of the core region 102 of waveguide structure 100. For example, the outer portions of core region 102 (e.g., not a middle portion of core region 102) can be doped such that they have higher cold refractive index values as compared with the cold refractive index values of the middle portion of core region 102.

It should be appreciated that although plot 300 of FIG. 3 illustrates the cold refractive index profile 302 having negative cold refractive index values in the second region 304, in other embodiments, cold refractive index profiles for waveguide structure 100 can be formed having a cold refractive index profile such that the cold refractive index values for second region 304 are positive or have a value of approximately zero. In such embodiments, the cold refractive index values of second region 304 can be less than cold refractive index value of at least one of or both of first and third regions 306a, 306b.

Figure 3A:
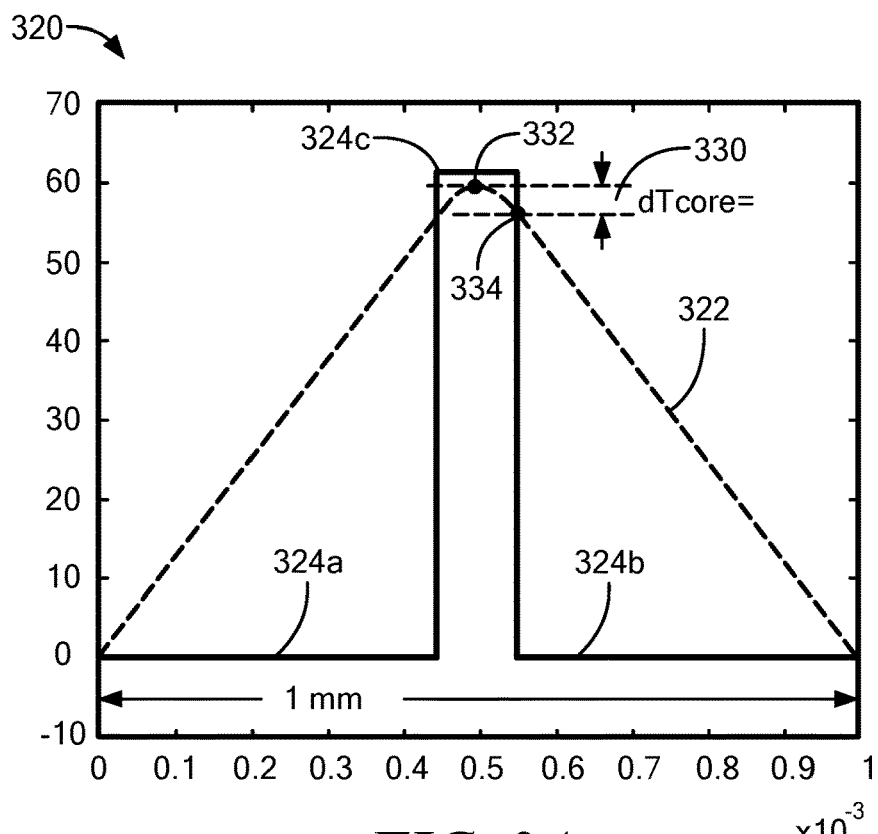
FIG. 3A shows a plot of thermal index profile and a gain profile of a symmetrically cooled planar waveguide structure.

Now referring to FIG. 3A, a plot 320 illustrates a temperature profile 322 (to which the thermal index profile is proportional) versus fast axis coordinate and the underlying step-doped gain profile 324 identified by the sum of first region 324a, second region 324c, and third region 324b, of a symmetrically cooled waveguide structure 100, where the vertical axis represents temperature values and gain ion doping density and the horizontal axis represents fast axis coordinate values of the waveguide structure 100 (e.g., location within the waveguide structure). In an embodiment, first and third region 324a, 324b of the gain profile may correspond to cladding regions 104, 106 respectively of the symmetrically cooled waveguide structure 100 and a second region (or center portion) 324c of the gain profile may correspond to core region 102 of the symmetrically cooled waveguide structure 100.

The temperature profile 322 underlying a thermal index profile may be formed responsive to thermal compensation, such as but not limited to in response to pump beam 120. For example, thermal index profile can be formed responsive to heat generated in the waveguide structure 100 and second region 324c (e.g., core region 102). The heat generated in response to the pump beam 120 being applied to the waveguide structure 100 and being absorbed by the core region 102 can result in the cold refractive index profile (e.g., cold refractive index profile 302 of FIG. 3) being modified such that a thermal index profile, which is proportional to the temperature profile 322, is formed.

In a fully symmetric structure of waveguide structure and heatsinks, as illustrated in FIG. 3, the temperature profile 322 is symmetric with the gain profile 324 including the temperature peak 332. Stated differently, the temperature profile 322 has a maximum value 332 (or a local maximum) located at a point within the second region 324c of the gain profile. In an embodiment, the location of the maximum value 332 may correspond to a generally middle portion of core region 102. It is understood that here we are using thermal index profile and temperature profile interchangeably as they are proportional.

A symmetric embodiment is represented in FIG. 3 and FIG. 3A. FIG. 3A shows a temperature profile and FIG. 3 shows a preferred cold refractive index profile derived from the temperature profile in FIG. 3A. The symmetric cooling provides in a hot state a temperature amplitude 330, $\Delta T$, within the core region, with the temperature amplitude 330 corresponding to a difference between a maximum value 332 of the temperature profile and a temperature value 334 at the core cladding interface. The cold refractive index amplitude of FIG. 3 has a corresponding amplitude in the refractive index profile, Δn, which is given by the relation Δn=−ΔT·dn/dT. As seen in FIG. 3A, the temperature profile includes the gradual fall-off, between core and heatsinks, of the temperature in the two cladding regions. The cold refractive index profile is chosen to be zero outside the core region. In this way, at the optimum compensation point, a flat refractive index plateau is achieved within the core region. Outside of the core region, i.e. in the claddings, the temperature induced refractive index, i.e. the thermal index profile, falls of gradually towards the heat sinks. In this way mode dependent confinement is achieved, where the fundamental mode is preferably with optimal overlap confined to the gain region and higher modes have less confinement and therefore less overlap with the gain region, and therefore less gain than the fundamental.

Figure 3B:
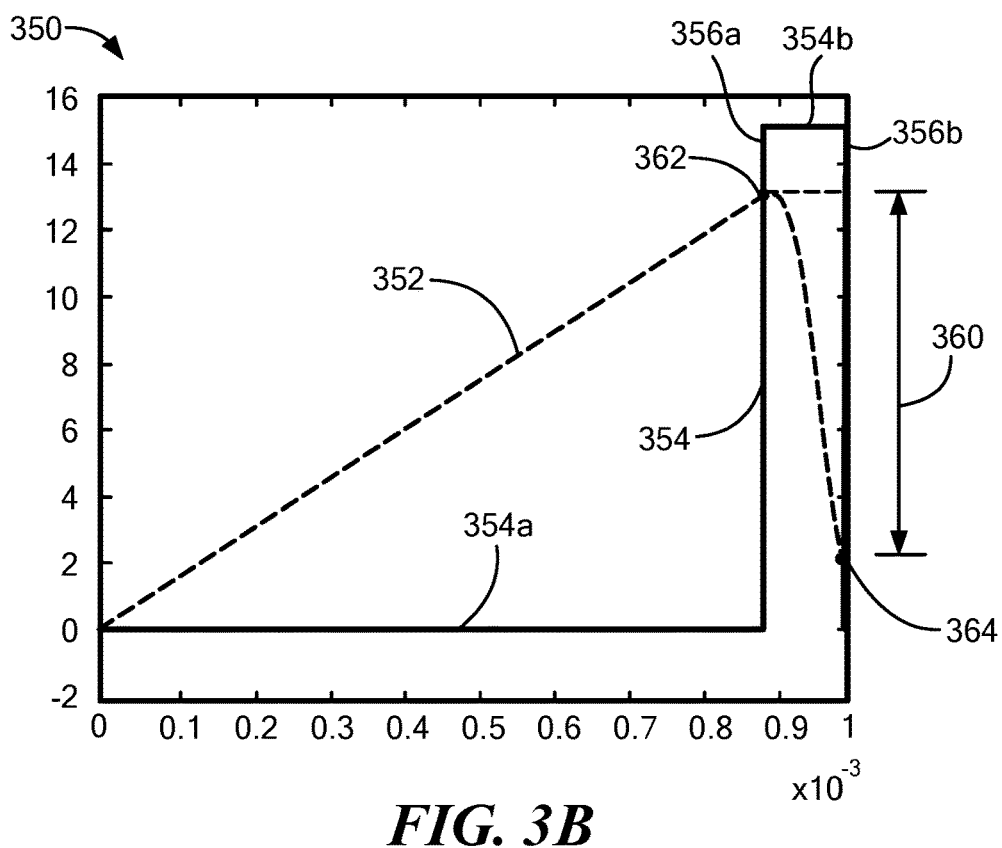
FIG. 3B shows a plot of thermal index profile and a gain profile of an asymmetrically cooled planar waveguide structure.

Now referring to FIG. 3B, a plot 350 illustrates a thermal index profile 352, which is proportional to the temperature profile with the same shape, and a gain profile 354 of an asymmetrically cooled waveguide structure 100 (FIG. 1). The vertical axis represents values for the temperature increase and the horizontal axis represents fast axis coordinates within the waveguide structure 100 (e.g., location within the waveguide structure). In an embodiment, a first region 354a of the gain profile 354 may correspond to one of cladding regions 104, 106 of the waveguide structure 100 of FIG. 1 and a second region 354b of the gain profile may correspond to core region 102 of the waveguide structure 100 of FIG. 1.

In a non-symmetric configuration, as illustrated in FIG. 3B, the thermal index profile 352 (and equivalently the temperature-rise profile) is not symmetric with the gain profile 354, which has a peak defined by first and second edges 356a,b. The thermal index profile 352 has a maximum value 362 (or local maximum) at the first edge 356a of the gain profile 354. In another embodiment, the first edge 356a may be disposed proximate to a heat sink, i.e. either 122, or 124 (FIG. 1) and the second edge 356b may be disposed distal from the proximate heat sink, thus maximum value 362 may be located at the second edge 356b.

Embodiments of the invention provide advantages of asymmetric cooling, with the core near the cooler temperatures as shown in FIG. 3B, so that the maximum temperature relative to cooler is reduced—in the example here by a factor of −4. It is understood that the temperature differential within the core is increased, also by a factor of −4.

Figures 4A, 4B:
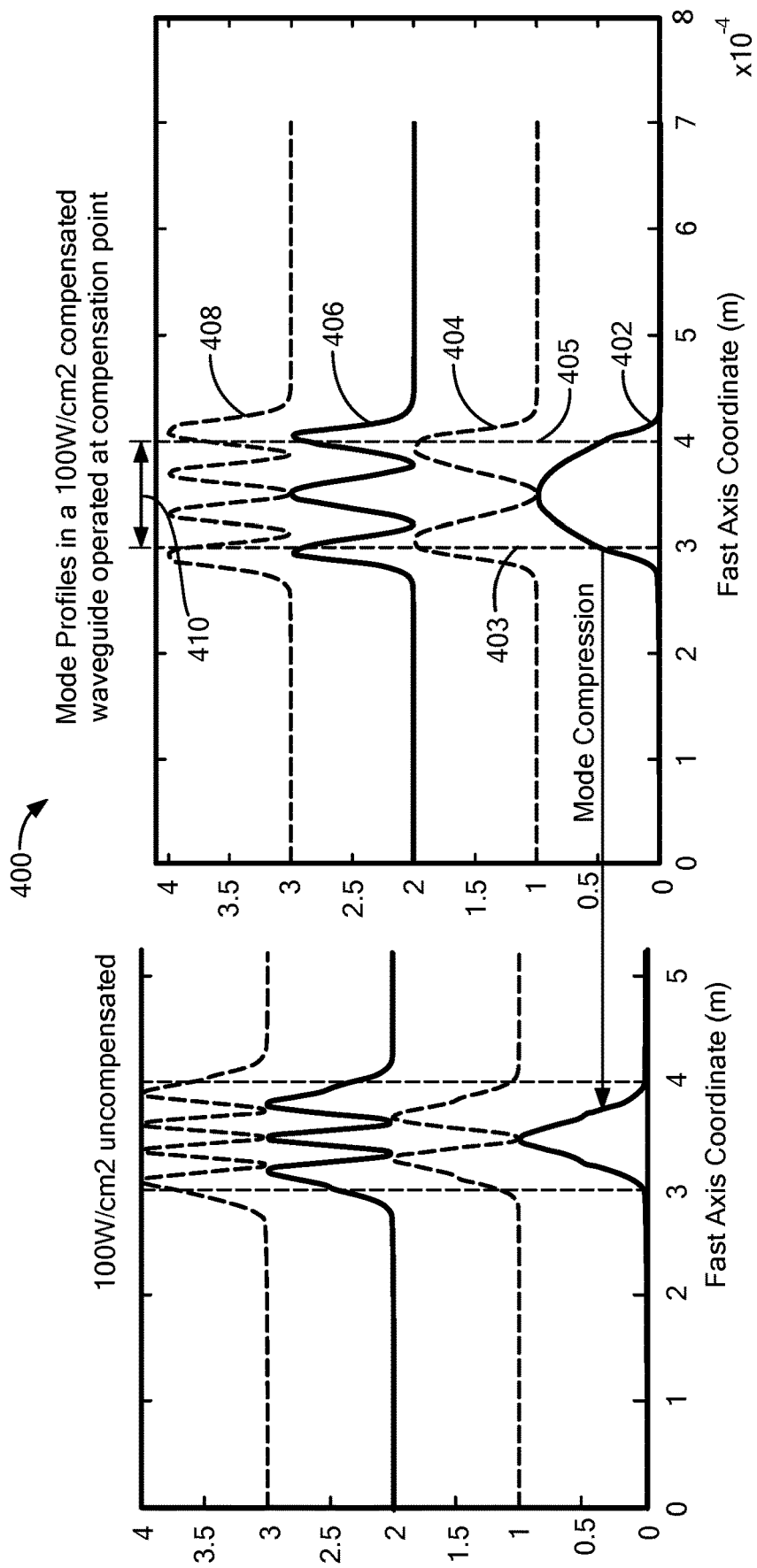
FIG. 4A shows mode compression for an uncompensated waveguide structure and FIG. 4B shows modes in a compensated waveguide structure where compression of the fundamental is avoided.

FIG. 4A shows mode profiles in an uncompensated waveguide and FIG. 4B shows mode profiles in a 100 W/cm$^2$ compensated waveguide in accordance with example embodiments of the invention, such as the waveguide 100 of FIG. 1. The two vertical lines 403, 405 mark the edges of a square doping profile of gain ions. FIG. 4A shows modes corresponding to a purely thermal refractive index guide, e.g., in the cold state the amplitude of the refractive index profile is zero. Under high power operation, the thermal index guide is generated by 100 W/cm2 of heat which flows transversely to the waveguide. The corresponding index profile is shown in your FIG. 3A.

In FIG. 4A, it can be seen how the fundamental mode is compressed/contracted and its overlap with the gain medium is sub optimal, which allows the buildup of higher order modes. FIG. 4B shows a waveguide that uses the constructed cold index profile 300 of FIG. 3, for example, so that fundamental mode overlap is more optimal, where higher modes have less overlap with the gain region and therefore gain filtering occurs in favor of the fundamental mode.

As shown in FIG. 4A, at desirable high power levels, the thermal index profile becomes stronger so that in a waveguide purely formed by the thermal refractive index (i.e. cold refractive index profile is zero), the fundamental mode is strongly confined/compressed, so that its overlap with the gain profile is considerably reduced and only a sub-region of the gain profile is utilized. This leads to suboptimal gain/energy extraction through the fundamental mode. As can be seen, higher order modes have better overlap with the gain region than the fundamental and therefore undesirable stronger gain for higher order modes results.

Now referring to FIG. 4B. In addition to the thermal index profile underlying the mode profiles of FIG. 4A, a cold index profile of the form shown in FIG. 3 was added. FIG. 4B shows a plot 400 illustrating a fast axis fundamental mode 402 (e.g., 1st order) and fast axis higher excited modes 404, 406, 408 (e.g., 2nd order, 3rd order, 4th order respectively) generated in response to a signal incident upon a waveguide structure, such as but not limited to, waveguide structure 100 of FIGS. 1 and 1A. Additionally, a core region 410 is provided in plot 400. In an embodiment, core region 410 may be the same as or substantially similar to core region 102 of FIGS. 1-1A.

Modes 402, 404, 406, 408 can be generated in response to a signal incident upon the waveguide structure 100. As illustrated in FIG. 4B, the fundamental mode 402 is substantially contained within the core region 410. The higher order modes 404, 406, 408 each include some portion within core region 410, but also includes portions that are outside of or otherwise leak out of core region 410. A greater percentage of fundamental mode 402 is contained with gain region 410 as compared with higher order modes 404, 406, 408. In an embodiment, fundamental mode 402 has a greater gain value than higher order modes 404, 406, 408. In contrast and for comparison, mode compression caused by an index profile purely thermal in nature, i.e. with a cold refractive index profile of zero amplitude is shown in FIG. 3. In an embodiment, with a properly constructed cold index profile, the thermal index profile can be configured to provide mode cleanup as the overlap with the core region 410 of higher order modes 404, 406, 408 is reduced as compared to a waveguide structure not having a thermal index profile formed therein. Thus, the higher order modes 404, 406, 408 have less gain as compared to the fundamental mode 402, as shown in FIG. 4B.

The plot of FIG. 4A is for a waveguide based purely on the thermal refractive index profile, where in the cold state the refractive index profile has zero amplitude and is neither guiding nor anti-guiding. The plot of FIG. 4B is for a waveguide that is compensated and operating at a selected compensation point. Comparison of the fundamental modes in FIGS. 4A and 4B clearly shows mode compression. Undesirable effects of mode compression include the reduced overlap with the gain ion profile, and such (a) reduced energy extraction and (b) uncontested gain for higher order modes.

In the compensated guide of FIG. 4B, the fundamental mode has excellent gain overlap, and build up of higher order modes is reduced. There is some mode clean-up since higher order modes have more of their energy outside of the gain region.

Figure 5:
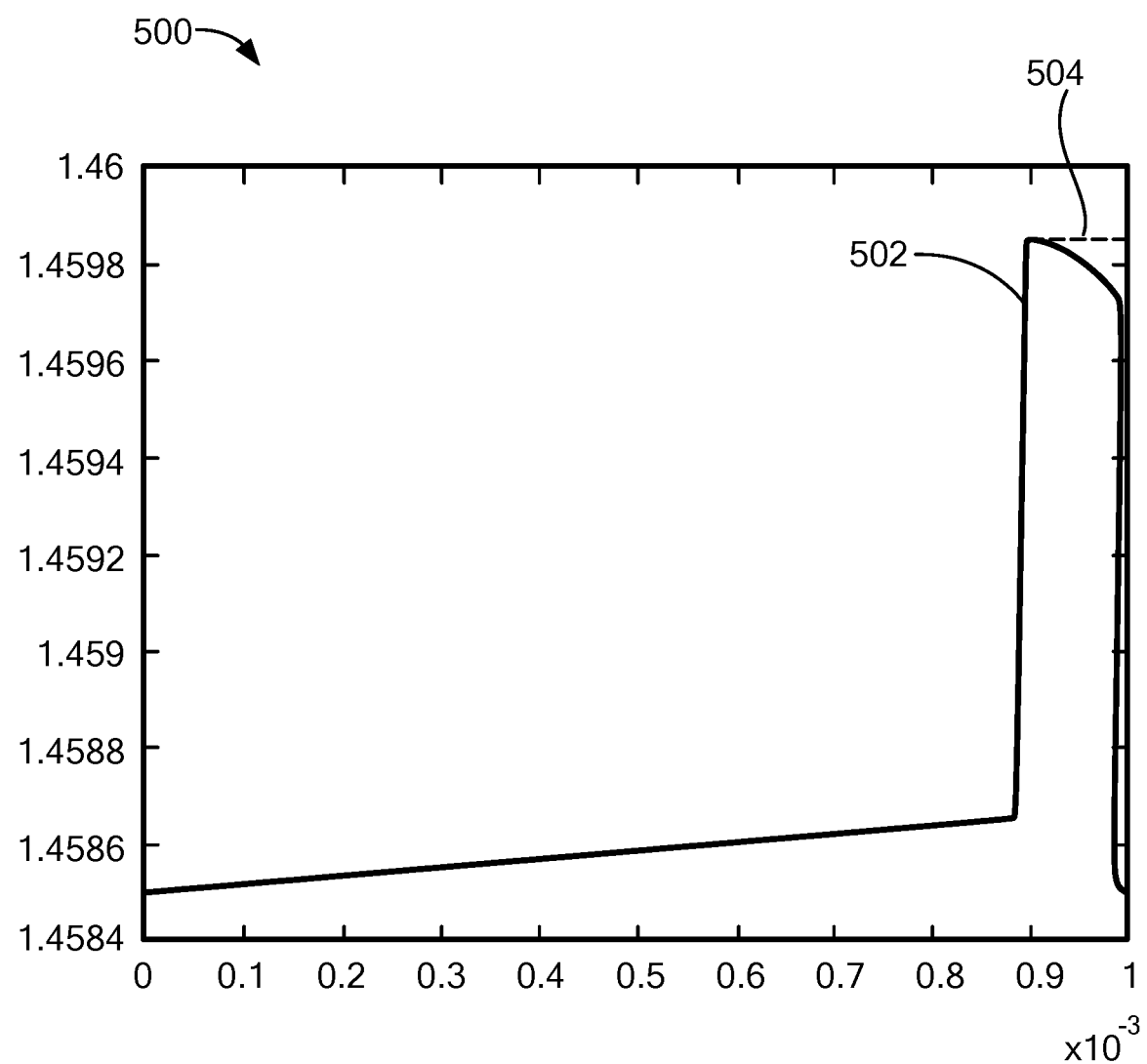
FIG. 5 shows a plot of a square index profile modified by a thermal index profile to form a curved index profile when a heat sink is positioned adjacent to a core region of a planar waveguide structure.

Now referring to FIG. 5, a plot 500 shows the superposition of a square refractive index profile 356 of FIG. 3B of a waveguide structure and a thermal index profile 502, which corresponds to the temperature profile 352 of FIG. 3B. In an embodiment, the hot index profile 502 may correspond to a waveguide structure having a heat sink positioned adjacent to a core region of the waveguide structure. In an embodiment, the cold refractive index profile 356 of FIG. 3B, which is a square index profile, may represent the underlying cold index profile in FIG. 5 of the waveguide structure prior to thermal compensation. The flat-top profile 504 may be a desirable hot profile, as it has a constant refractive index within the core region, and as such, allows for a fundamental mode which extends over the full width of the core, i.e. mode compression is avoided. A difference profile can be constructed by subtracting profile 502 from profile 504. That difference profile is shown in FIG. 7. The sum of square index profile 356 and the difference profile 702 can form a cold profile which exhibits the preferred behavior at a preferred hot operating point, i.e., the flat-top profile 504 can be realized through thermal compensation at the preferred operating point.

The hot index profile 502 in FIG. 5 may have issues which can reduce or prevent desired mode filtering in favor of the fundamental mode: (a) Profile 502 does not have a flat plateau but has within the gain profile a curved shape with a cusp. Because of the cusp, the fundamental mode is pulled/compressed into the high index region of the cusp. Consequently, overlap of the fundamental with the gain region is reduced and therefore suboptimal. Following the cusp gradient, higher order modes increasingly extend further out and, therefore, have better overlap with the gain medium. Therefore, the opposite of the preferred gain filtering is achieved as higher order modes have better gain/energy extraction. (b) The second issue is that the profile has index steps at core cladding boundaries. These steps are generally effective in confining a large number of the lowest order modes. So, even if we achieve the optimally compensated profile 504, there may be no mode filtering in favor of the fundamental, since the overlap with the gain medium is the same for a large number of higher order modes.

It is understood that the profile as shown in FIG. 5, is the superposition of a cold index profile which is square, and the thermal index profile at some operating/heat dissipation level (here 30 W/cm2). The curvature shown at the top of the refractive index profile is undesirable, as it leads to mode compression (The mode is pulled into the high index area at the cusp.) Note that the difference between the dashed line 504 and the solid line 502 is shown in FIG. 7.

A preferable cold index profile is achieved when we add the profile of FIG. 7 to the underlying cold, square profile of FIG. 5. With the new cold profile, the hot refractive index will be flat at the chosen operating point. Flat behavior is displayed by 684 of FIG. 6D. However, the underlying cold refractive index profile of these three hot index plots is shown by FIG. 7, i.e. the amplitude of the square part in this case is zero. One can see this in the refractive index profiles of FIG. 6D. There is no step at the core-to-thick-cladding boundary, the square curve in FIG. 6D shows only the gain ion profile.

It is understood that a compensated profile has undesirable properties in the cold state, but achieves desirable properties at a hot operating point for which it is designed. The cold profile can be referred to as thermally compensatable, or pre-compensated. The thermal index profile "compensates" the undesirable properties of the constructed cold profile. It should be noted that it is not any profile which can be thermally compensated, rather it is a constructed profile, which reflects the heat dissipating properties of the gain ion profile and the heatsink configuration, which can be thermally compensated.

Figure 6:
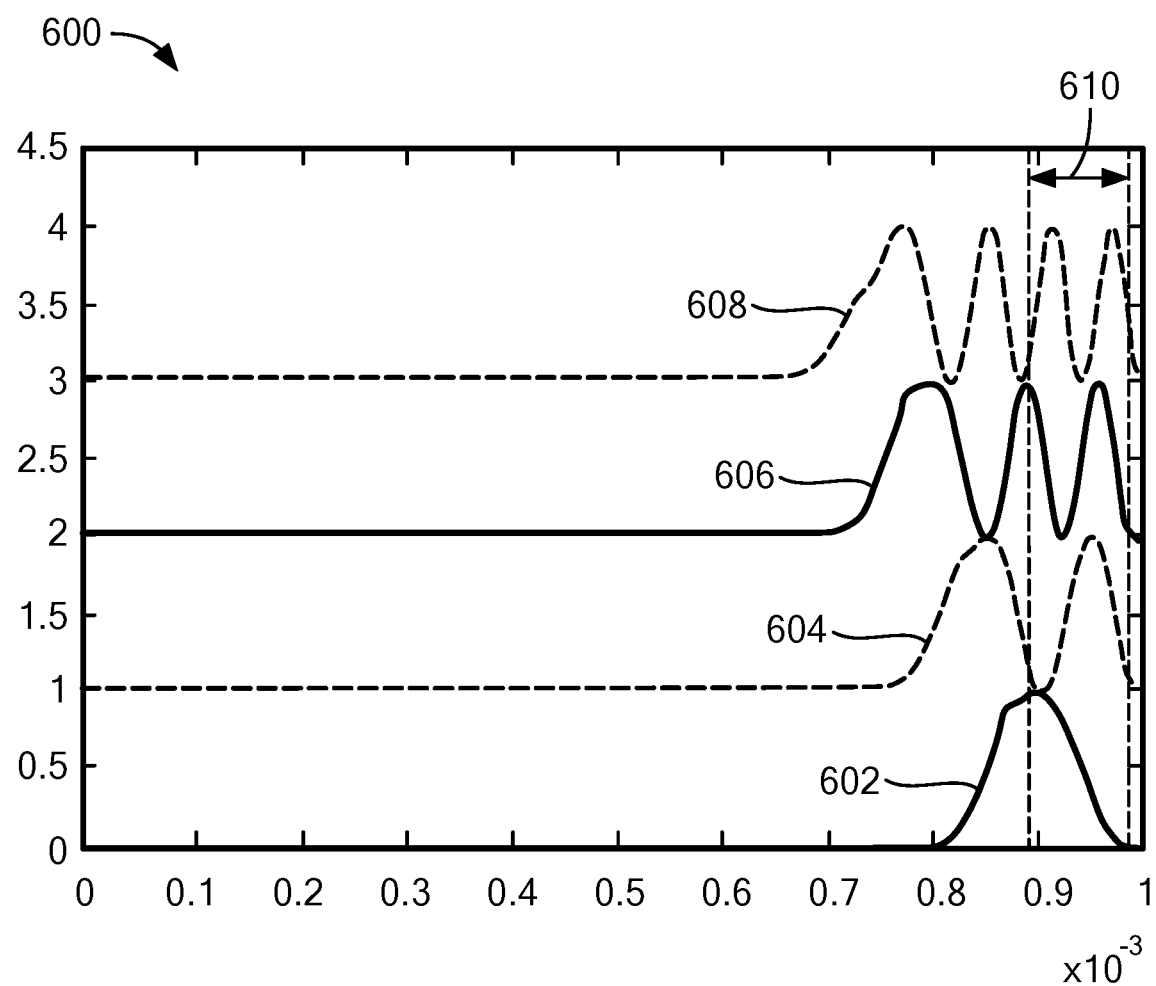
FIG. 6 shows a plot illustrating the four modes generated in response to a signal incident upon a thermally compensated waveguide structure with the thermally compensated waveguide structure compensated for an operating parameter of 30 W/cm$^2$.
Figure 6D:
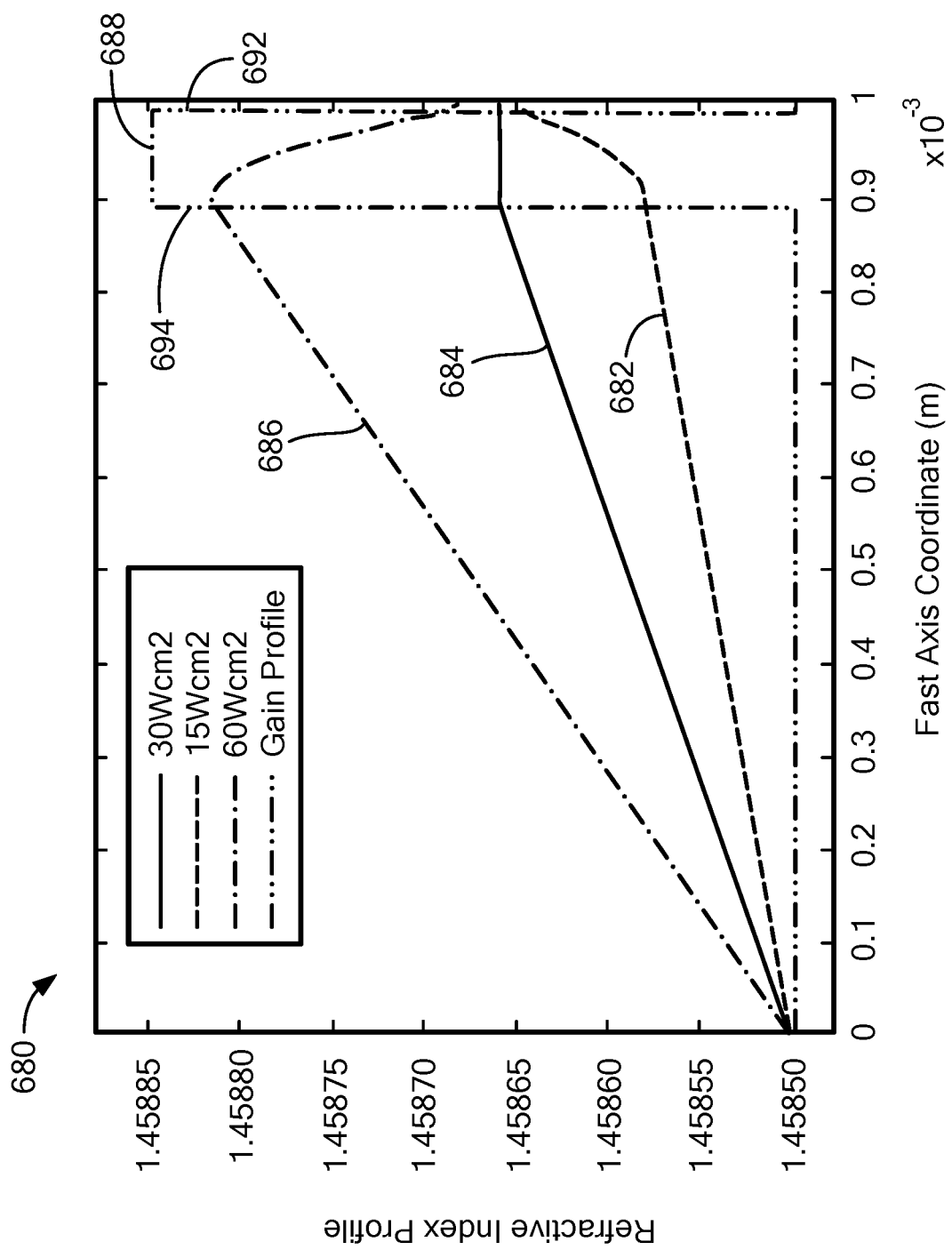
FIG. 6D shows refractive index profiles of a waveguide structure which has been optimized for operation at 30 W/cm2, when operated below (15 W/cm2, FIG. 6A), at (30 W/cm2, FIG. 6B), and above (60 W/cm2, FIG. C) the optimum compensation point. The corresponding mode profiles were shown in FIGS. 6A, B, and C.

A preferred cold refractive index profile 702 is shown in FIG. 7 that can be thermally compensated to achieve a preferred hot index profile 684 as shown in FIG. 6D. In comparison, also in FIG. 6D, profile 682 is under-compensated and profile 686 is over-compensated. Note, that again, profile 702 is convex within the core region.

The preferred cold refractive index profile 702 is continuous at the interface of the core to the thick cladding, i.e. there is no index step. Because of this, mode confinement is provided by the gradual fall-off of the thermal index in the thick cladding region. The modes shown in FIG. 6 occur at the optimally compensated operating point and correspond to the refractive index profile 684 of FIG. 6D. Because of the gradual, step-free, fall-off of the hot index profile into the thick cladding, mode dependent confinement and mode dependent overlap with the gain region occurs which favors gain and energy extraction by the fundamental mode. As shown, cold index profile 702 has a step at the edge 692 (FIG. 6D). This can be preferable, as it isolates the waveguide modes from possibly lossy regions at or near the adjacent heatsink. For a core region sufficiently removed from the adjacent heatsink, it can be preferable to make the cold index profile completely step-free. In this case, higher order modes will extend out of the gain region and start interacting with the possibly lossy regions near the heatsink interface. This could have the added advantage that mode filtering is achieved through mode dependent loss, with the least amount of loss being experienced by the fundamental. We can therefore construct waveguide structures, which achieve mode filtering through two mechanisms, (a) mode dependent gain, and (b) mode dependent loss, both of which act in favor the fundamental mode. It is understood that mode filtering is achieved only in the case when the amplitude of the square profile is zero since a non-zero square profile provides strong confinement, which limits the extent of fundamental and at least the first few of the higher order modes. The desired mode filtering in favor of the fundamental mode is achieved, as described above, when the purely thermal index profile, caused by pump and signal acting on the square gain ion profile, is superimposed onto the cold profile of FIG. 7.

Figure 5A:
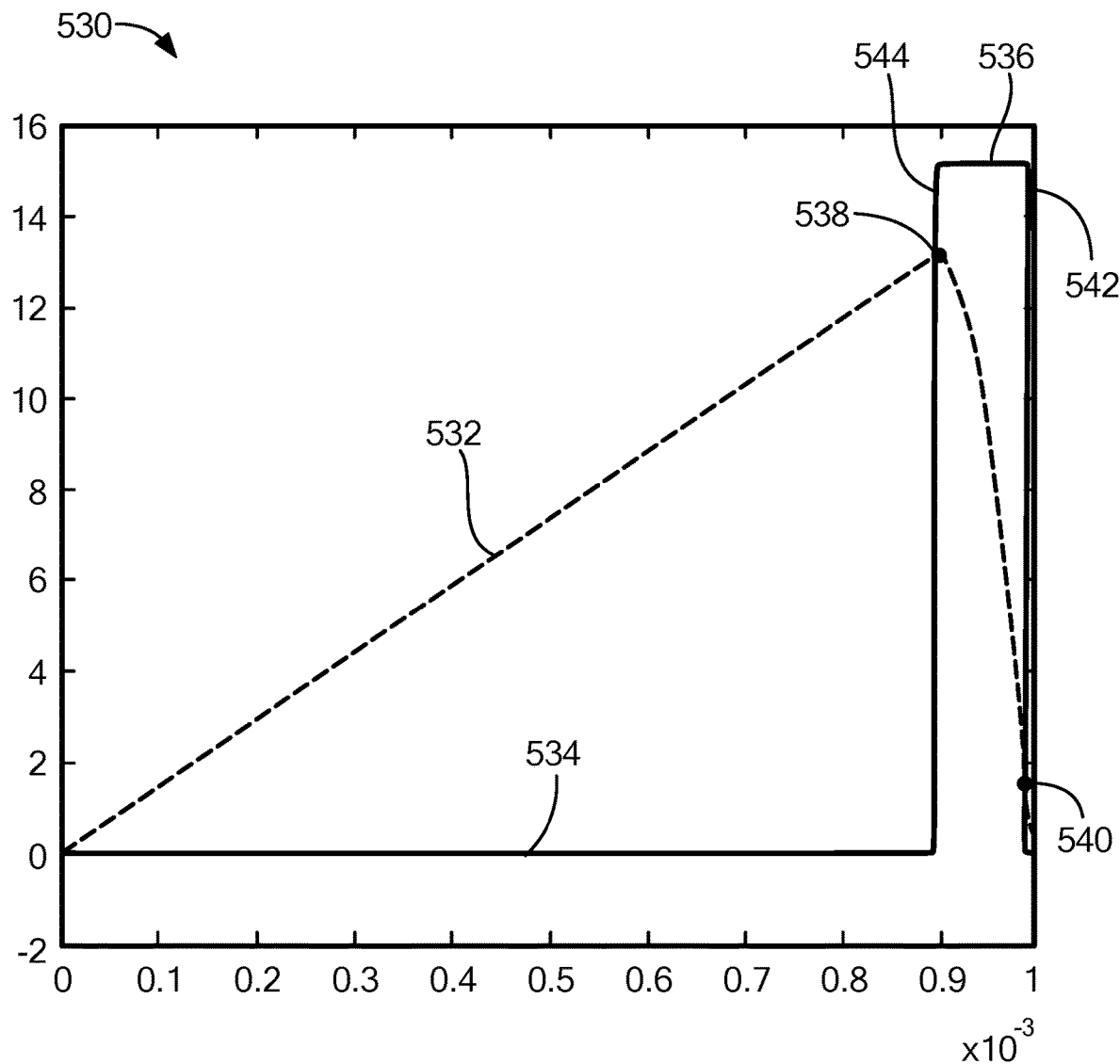
FIG. 5A shows a plot of the corresponding thermal index profile of the planar waveguide structure of FIG. 5 and a gain profile of that planar waveguide structure.

Now referring to FIG. 5A, a plot 530 shows a temperature-rise (or thermal index) profile 532 which has an amplitude of 14C with the same shape as the thermal index profile, and a gain profile 534. The plot can be for the waveguide structure 100 of FIG. 1, for example. The gain profile 534 includes a first region 534 and a second region 536, having a first edge 542 and a second edge 544. In an embodiment, the first region 534 may correspond to one of cladding regions 104, 106 of waveguide structure 100 of FIG. 1 and second region 536 may correspond to core region 102 of waveguide structure 100 of FIG. 1.

As illustrated in FIG. 5A, the thermal index profile 532 has a maximum value 538 (or local maximum) at the second edge 544 and a minimum value 540 at the first edge 542 of second region 536. The change in the profile 532 can be modified based at least in part on a type of application of a particular waveguide structure 100 and a power level associated with the application of the particular waveguide. For example, in some embodiments, in higher power applications (e.g., greater than 30 kW), asymmetrically cooled waveguide structures can be used and in lower power applications (e.g., less than 30 kW), symmetrically cooled waveguide structures can be used.

The change in the thermal index profile 532 from the maximum value 538 to the minimum value 540 can be modified based in part on a method of cooling applied to the waveguide structure 100 and/or the placement of one or more heat sinks 122, 124 relative to the core region 102. For example, the thermal index profile 532 illustrated in FIG. 5A can be the result of an asymmetrically cooled waveguide structure 100 having a heat sink 122, 124 disposed adjacent to the first edge 542 of the core region 102 and distal from second edge 544.

In some embodiments, an asymmetrically cooled waveguide structure 100 can be configured to reduce an internal temperature by a greater amount as compared with a symmetrically cooled waveguide structure and therefore can have a lower maximum temperature 538 as compared to a symmetrically cooled waveguide structure.

The modes shown in FIG. 6 are based on a square gain ion profile, and the cold refractive index profile of FIG. 7, which is not square. Plot 600 illustrates a fast axis fundamental mode 602 (e.g., $1^{st}$ order) and fast axis higher excited modes 604, 606, 608 (e.g., $2^{nd}$ order, $3^{rd}$ order, $4^{th}$ order respectively) generated in response to a signal incident upon a thermally compensated waveguide structure, such as but not limited to, waveguide structure 100 of FIGS. 1 and 1A. Note, as shown, modes are represented by intensity profiles. For convenience of display we have chosen to normalize the amplitudes of these intensity profiles to one. A physically more relevant normalization is the normalization of the mode areas per unit power. In unit power normalization, the amplitude of the higher order modes is therefore progressively reduced with increasing mode order. It is the power normalized mode profiles and their overlap with the gain region which determines their comparative ability to extract energy.

In an embodiment, the modes 602, 604, 606, 608 illustrated in plot 600 can be generated by the thermally compensated waveguide structure having a thermal index profile and the thermally compensated waveguide structure can be thermally compensated for a predetermined operating parameter (e.g., 15 W/cm$^2$, 30 W/cm$^2$, 60 W/cm$^2$, etc.). The operating parameter may refer to a heat transfer rate of the thermally compensated waveguide structure 100. In some embodiment, the cold refractive index profile of a core region 102 of the thermally compensated waveguide structure 100 can be modified to have a numerical aperture of approximately zero or it may be anti-guiding. For example, the refractive index profile of the core region 102 can be modified such that core region 102 does not have waveguiding properties (or is anti-guiding) without the refractive properties provided by the thermal index profile.

The thermal index profile of the thermally compensated waveguide structure 100 can be configured to provide mode filtering, as illustrated in plot 600 of FIG. 6. For example, the core region 102 of the waveguide structure 100 can have a gain region 610. As illustrated in FIG. 6, a greater percentage of the fundamental mode 602 is within gain region 610 as compared with the higher order modes 604, 606, 608. Thus, the hot index profile provides discrimination between the fundamental mode 602 and the higher order excited modes 604, 606, 608 as a greater percentage of the higher order modes 604, 606, 608 leak out of the gain region 610 as compared with the fundamental mode 602.

Now referring to FIGS. 6A-6C which compare the mode filtering provided by different levels of thermal compensation of the cold index profile 702 of FIG. 7. The cold index profile of FIG. 7 plus the superimposed thermal index profiles corresponding to 15, 30, and 60 W/cm2 compensation cause the behavior shown. The amplitude of the cold index profile was chosen for optimum compensation near 30 W/cm2. Here, one should notice, that the amplitude of the cold profile determines the optimal compensation point. For example, if a certain amplitude is optimal for 30 W/cm2, then double that amplitude would be optimal for 60 W/cm2.

In FIG. 6D, the hot refractive index profiles reflect under-compensation, 682, optimum compensation, 684, and overcompensation, 686. The optimally compensated case, 684, achieves a flat index profile within the gain region 688. The non-optimally compensated cases have non-flat behavior, with high index cusps near the borders of the heat generating region 688 (which coincides here with the gain region). In the under-compensated case the cusp moves towards the edge of the heat generating region 688 closest to the heatsink. In the overcompensated case, the cusp moves towards the distal edge of region 688 relative to the heatsink. Cusps of high refractive index lead to mode compression into the cusp area, where the width of the fast axis fundamental mode is compressed/reduced relative to the optimum case 684. In the under-compensated case the fundamental mode is compressed against the cooler, in the over compensated case away from the cooler. Mode compression of the fundamental leads to suboptimal overlap of the fundamental with the gain region, i.e. there are substantial areas within the gain region where the amplitude of the fundamental is small compared to the amplitudes of higher order modes. Under such non-optimal conditions, appreciable energy is extracted by higher order modes which is undesirable.

For example in the optimally compensated case, plot 640 of FIG. 6B illustrates a fast axis fundamental mode 642 (e.g., $1^{st}$ order) and fast axis higher excited modes 644, 646, 648 (e.g., $2^{nd}$ order, $3^{rd}$ order, $4^{th}$ order respectively) generated by a thermally compensated waveguide structure 100 having a thermal index profile and thermally compensated for a first predetermined operating parameter of 30 W/cm$^2$. In comparison, FIG. 6A and FIG. 6C show behavior at 15 W/cm2 and 60 W/cm2, i.e. below and above the (chosen by design) optimum compensation point of 30 W/cm2.

As illustrated in FIG. 6A, the waveguide structure is under-compensated as it is operated at 0.5 times the optimal compensation. As a consequence, the fundamental mode 622 is under-filling the gain region leading to suboptimal energy extraction. While higher order modes reach significantly into the cladding, which is preferred for mode clean-up, they do, however, fully overlap the gain region, more so than the fundamental, which leads to undesirable energy extraction by higher order modes.

In an embodiment, gain region 630 can have a first edge 632 and a second edge 634. The thermal index profile can provide mode compression towards an edge of the gain region 630 based in part on a power level of the particular application of the thermally compensated waveguide structure 100. For example, in the illustrative embodiment of FIG. 6A, the first operating parameter may correspond to a lower power or under-compensated application, such as but not limited to 15 W/cm$^2$. In under-compensated applications, the thermal guide index can provide mode compression such that it compresses the modes 622, 624, 626, 628 towards the first edge 632 of the gain region 630 that is disposed proximate to a heat sink 122, 124, with second edge 634 disposed distal from the heat sink 122, 124.

Now referring to FIG. 6B, plot 640 illustrates an about optimally compensated case with a fast axis fundamental mode 642 (e.g., 1st order) and fast axis higher excited modes 644, 646, 648 (e.g., 2nd order, 3rd order, 4th order respectively) generated by a thermally compensated waveguide structure 100 having a thermal index profile and thermally compensated for a second predetermined value of an operating parameter (e.g. here 30 W/cm² in comparison to 15 W/cm² for FIG. 6A). It should be appreciated that this second predetermined value of an operating parameter (or second operating parameter) is different than the first operating parameter described above with respect to FIG. 6A.

As illustrated in FIG. 6B, which reflects the case of near optimum compensation, a greater percentage of the fundamental mode 642 is contained within a gain region 650 as compared with the higher order modes 644, 646, 648. Gain region 650 can have a first edge 652 and a second edge 654. It should be noted that the width of the fundamental mode is increased and therefore the overlap of the fundamental mode with the gain region is improved, compared with the under compensated case of FIG. 6A and the over compensated case of FIG. 6C.

In the illustrative embodiment of FIG. 6B, which is near optimum compensation, the second operating parameter may correspond to a higher power application than the first operating parameter described above with respect to FIG. 6A, such as but not limited to 30 W/cm2. In such an embodiment, the thermal index profile can provide conditions for minimal mode compression of the fundamental.

Plot 660 of FIG. 6C, which reflects the case of overcompensation, illustrates a fast axis fundamental mode 662 (e.g., $1^{st}$ order) and fast axis higher excited modes 664, 666, 668 (e.g., $2^{nd}$ order, $3^{rd}$ order, $4^{th}$ order respectively) generated by a thermally compensated waveguide structure having a thermal index profile and thermally compensated for a third predetermined operating parameter. It should be appreciated that the third predetermined operating parameter (or third operating parameter) is different than the first operating parameter described above with respect to FIG. 6A and the second operating parameter described above with respect to FIG. 6B.

As illustrated in plot 660 of FIG. 6C, similar to plots 620 of FIG. 6A and plot 640 of FIG. 6B, the fundamental mode in this over-compensated case is compressed against edge 674 distal to the adjacent heatsink. Similar to the undercompensated case, mode compression leads to incomplete overlap of the fundamental mode with the gain region, and modes of even higher order than those shown will be more effective in extracting energy from the core regions where the fundamental mode is weak.

In the illustrative embodiment of FIG. 6C, the third operating parameter may correspond to a higher power application than the first and second operating parameters described above with respect to FIG. 6A and FIG. 6B, respectively, such as but not limited to 60 W/cm2. In higher power applications, the thermal index profile can provide mode compression such that it compresses the modes 662, 664, 666, 668 away from the first edge 672 of the gain region 670 that is disposed proximate to a heat sink 122, 124 and towards the second edge 674 disposed distal from the heat sink 122, 124.

Thus, FIGS. 6A-6C illustrate that a cold refractive index structure can be configured to provide mode filtering which favors the fundamental mode at a compensation corresponding to a high power operating point. Going above or below the optimum compensation, said mode filtering degrades gradually and predictably, such that for a given structure designed for a certain operating parameter, a parameter region exists, where appreciable mode filtering in favor of the fundamental mode is achieved.

Now referring to FIG. 6D, three thermally compensated refractive index profiles 682, 684, and 686 are shown. In addition, there is the underlying gain-ion doping profile 694, which in its shape, in this particular example, describes also the heat generation profile. All three thermally compensated index profiles have the same underlying cold refractive index profile, 702 of FIG. 7. Of the three thermally compensated index profiles, 684 is optimally compensated, as it shows a flat index plateau in the gain region 688, whereas 682 is under-compensated, and 686 is over-compensated. The non-optimally compensated cases have high refractive index cusps, which lead to mode compression relative to the optimally compensated case. Under-compensation compresses the fundamental mode towards the proximate heatsink, whereas over-compensation compresses the fundamental mode towards the distal side of the heat generating region.

Gain region 688 can have a first edge 692 and a second edge 694. In an embodiment, one or more heat sinks 122, 124 may be positioned proximate to first edge 692 and distal from second edge 694. The first thermal index profile 682 peaks at first edge 692 and thus a corresponding fundamental mode can be compressed towards the first edge 692. In some embodiments, the first hot index profile 682 may correspond to a thermally compensated waveguide structure operated at low power.

As illustrated in FIG. 6D, the second hot index profile 684 is substantially flat in the gain region 688 and thus provides greater overlap with the gain region 688 for a fast axis fundamental mode. It occurs when the waveguide structure is operated at a preferred intermediate power level for which the waveguide structure was designed.

Now referring to FIG. 7, a plot 700 of a cold refractive index profile 702 for a core region 102 of a planar waveguide structure 100 is provided having a change in a refractive index value shown on the vertical axis and a fast axis coordinate shown on the horizontal axis. In an embodiment, the cold refractive index profile 702 may correspond to the cold refractive index profile that mode profiles illustrated in FIGS. 6-6D are based on.

Cold refractive index profile 702 can be used to achieve a desired operating parameter for a waveguide structure 100. For example, cold refractive index profile 702 can be generated having a predetermined response to thermal compensation, such that in response to the thermal compensation, a desired thermal index profile is formed for the respective waveguide structure 100 at a particular operating point. The operating parameter may refer to a heat transfer rate of the waveguide structure 100 (e.g., 15 W/cm², 30 W/cm2·60 W/cm², etc.), as illustrated in FIGS. 6-6D. Thus, in some embodiments, the cold refractive index profile 702 may be referred to as an extra doping profile added or otherwise formed within the core region 102 such that the waveguide structure 100 can be configured for the desired operating parameter in response to a pump signal 120.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:
1. A planar amplifier structure, comprising:
    a core region including a gain region having a gain ion profile, wherein the core region includes a fast axis and a slow axis;

one or more cladding regions disposed adjacent to the core region; and one or more heat sinks coupled to the one or more cladding regions, wherein the planar amplifier structure has a cold refractive index profile that is convex in the fast axis within the core region for reducing mode compression and increasing overlap of a fundamental mode of the structure with the gain region at an operating parameter.

2. The planar amplifier structure of claim 1, wherein a geometry of the core region, the one or more cladding regions and the one or more heat sinks with respect to each other form the planar amplifier structure having a hot index profile corresponding to a combination of the cold refractive index profile and a thermal index profile.

3. The planar amplifier structure of claim 1, further comprising one or more optical pump beams and a signal beam coupled to the planar waveguide structure to provide pump beam and a signal beam to the planar amplifier structure such that, responsive to the optical beams, a thermally compensated waveguide is formed having a thermal index profile, and wherein the core region is configured to guide optical signals incident on the core region through the core region according to properties of the thermal index profile and the operating parameter of the planar waveguide structure.

4. The planar amplifier structure of claim 1, further comprising one or more interfaces between the core and the one or more cladding regions, wherein refractive index values of the core at the one or more interfaces are greater than the cold refractive index values of the one or more cladding regions at the core-cladding interfaces.

5. The planar amplifier structure of claim 4, wherein the cold refractive index profiles are continuous for at least one of the one or more core-cladding interfaces.

6. The planar amplifier structure of claim 5, wherein cold refractive index values for the one or more cladding regions at the core-cladding interfaces are substantially equal.

7. The planar amplifier structure of claim 6, wherein the one or more cladding regions have a refractive index profile and the cladding refractive index profile provides mode filtering such that a fundamental mode of the fast axis coordinate has a greater gain value than higher order modes of the fast axis coordinate.

8. The planar waveguide structure of claim 4, wherein the refractive index profile is continuous at each of the one or more interfaces.

9. The planar waveguide structure of claim 8, wherein cold refractive index values for the one or more cladding regions are substantially equal at the core-cladding interfaces.

10. The planar waveguide structure of claim 9, wherein the one or more cladding regions have a cladding refractive index profile that provides mode filtering such that a fundamental mode of the fast axis coordinate has a greater gain value than higher order modes of the fast axis coordinate.

11. The planar amplifier structure of claim 1, wherein a fast axis coordinate of a local maximum of the cold refractive index profile corresponds to a location in the core region proximate an interface of the core region and the one or more cladding regions.

12. The planar amplifier structure of claim 1, wherein a cold refractive index value at a location in the core region is less than a cold refractive index value of at least one of the one or more cladding regions.

13. The planar amplifier structure of claim 1, wherein the one or more heat sinks provide asymmetric cooling.

14. The planar amplifier structure of claim 1, wherein the one or more heat sinks provide symmetric cooling.

15. The planar amplifier structure of claim 1, wherein the core region has a substantially flat refractive index profile at the operating parameter.

16. The planar amplifier structure of claim 1, wherein the hot index profile provides fast axis thermal lensing for the planar amplifier structure.

17. A method for providing an amplifier structure, comprising:

employing a core region including a gain region having a gain ion profile, wherein the core region includes a fast axis and a slow axis;

employing one or more cladding regions disposed adjacent to the core region; and employing one or more heat sinks coupled to the one or more cladding regions, wherein the planar amplifier structure has a cold refractive index profile that is convex in the fast axis within the core region for reducing mode compression and increasing overlap of a fundamental mode of the structure with the gain region at an operating parameter.

18. The method of claim 17, wherein a geometry of the core region, the one or more cladding regions and the one or more heat sinks with respect to each other form the planar amplifier structure having a hot index profile corresponding to a combination of the cold refractive index profile and a thermal index profile.

19. The method of claim 17, further comprising employing one or more optical pump beams and a signal beam coupled to the planar waveguide structure to provide pump beam and a signal beam to the planar amplifier structure such that, responsive to the optical beams, a thermally compensated waveguide is formed having a thermal index profile, and wherein the core region is configured to guide optical signals incident on the core region through the core region according to properties of the thermal index profile and the operating parameter of the planar waveguide structure.

* * * * *